(12) United States Patent
Takai et al.

(10) Patent No.: US 8,159,754 B2
(45) Date of Patent: Apr. 17, 2012

(54) OPTICAL DEVICE, ELECTRONIC APPARATUS, AND METHOD OF MANUFACTURING OPTICAL DEVICE

(75) Inventors: Yuichi Takai, Tokyo (JP); Tetsuyuki Yoshida, Tokyo (JP); Hiroaki Ishiguro, Aichi (JP); Masahiro Shimase, Aichi (JP)

(73) Assignee: Sony Corporation, Tokyo (JP)

( * ) Notice: Subject to any disclaimer, the term of this patent is extended or adjusted under 35 U.S.C. 154(b) by 191 days.

(21) Appl. No.: 12/754,959

(22) Filed: Apr. 6, 2010

(65) Prior Publication Data

US 2010/0271709 A1 Oct. 28, 2010

(30) Foreign Application Priority Data

Apr. 23, 2009 (JP) ................ P2009-104880

(51) Int. Cl.
*G02B 1/06* (2006.01)
(52) U.S. Cl. ........................................ 359/665
(58) Field of Classification Search ........... 359/665
See application file for complete search history.

(56) References Cited

U.S. PATENT DOCUMENTS

2010/0232161 A1* 9/2010 Aschwanden et al. ........ 362/278

FOREIGN PATENT DOCUMENTS

JP 2007-519970 7/2007

* cited by examiner

*Primary Examiner* — Joseph P Martinez
(74) *Attorney, Agent, or Firm* — K&L Gates LLP

(57) ABSTRACT

Disclosed herein is an optical device including: a light-transmitting first main body which constitutes a part on a light incidence side; a light-transmitting second main body which constitutes a part on a light outgoing side; a third main body which is stacked between the first main body and the second main body in a second direction orthogonal to the first direction, and which defines a liquid chamber between the first main body and the second main body; a lens surface which is formed by an interface between a plurality of liquids differing in refractive index and sealed in the inside of the liquid chamber, and which is electrically deformable; and a jig which clamps the mutually stacked first main body, second main body, and third main body in the second direction by the third engaging part and the fourth engaging part.

7 Claims, 13 Drawing Sheets

F I G . 3
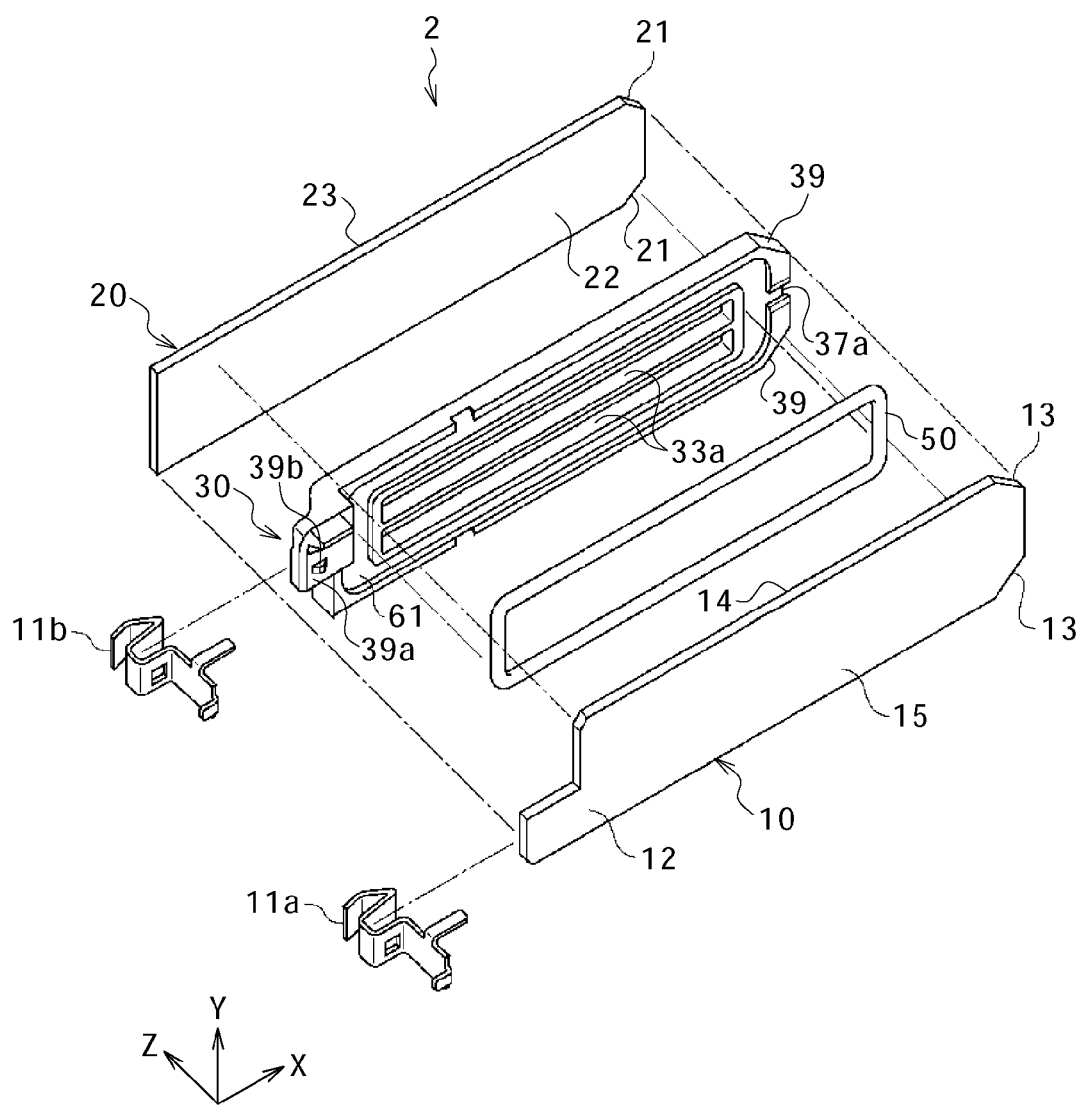

OPTICAL DEVICE, ELECTRONIC APPARATUS, AND METHOD OF MANUFACTURING OPTICAL DEVICE

CROSS REFERENCES TO RELATED APPLICATIONS

The present application claims priority to Japanese Priority Patent Application JP 2009-104880 filed in the Japan Patent Office on Apr. 23, 2009, the entire content of which is hereby incorporated by reference.

BACKGROUND

The present application relates to an optical device utilizing the electrowetting phenomenon, an electronic apparatus, and a method of manufacturing an optical device.

A liquid lens device as an optical device utilizing the electrowetting phenomenon has been known in which liquids are sealed in a liquid chamber defined by a pair of lens members disposed opposite to each other and an annular main body substrate (refer to, for example, JP-T-2007-519970 (paragraphs [0051] and [0052], FIG. 9), hereinafter referred to as Patent Document 1).

The liquid lens device described in Patent Document 1 has a plurality of fastening units, by which a pair of lens members and a main body substrate are mutually fixed. More specifically, at the time of sealing the liquids, an upper fastening unit comes into engagement with a plurality of parts of the main body substrate which are opposed to a lower lens member, thereby fixing an upper lens member to the main body substrate. On the other hand, a lower fastening unit comes into engagement with a plurality of parts of the main body substrate which are opposed to the upper lens member, thereby fixing the lower lens member to the main body substrate. Here, the upper fastening unit and the lower fastening unit are engaged with the main body substrate alternately along the outer circumferential direction, whereby the liquids are sealed in a liquid chamber defined by the pair of lens members and the main body substrate.

SUMMARY

In the liquid lens device described in Patent Document 1, the plurality of fastening units are respectively attached to the main body substrate. Therefore, the forces necessary for sealing the liquids are concentrated onto the main body substrate. Since the fastening units are each engaged with a plurality of parts of the main body substrate, stress is locally concentrated on a region or regions depending on the shape of the engaging parts of the fastening units and the like factors, possibly leading to such problems as breakage of the main body substrate.

Besides, in the liquid lens device, the internal pressure in the liquid chamber may be varied due to a temperature change, a shock or the like at the time of sealing the liquids. When the sealing operation is influenced by such a disturbance, the sealing performance in the liquid lens device may be deteriorated. As means for suppressing the deterioration of the sealing performance, control of the internal pressure in the liquid chamber at the time of sealing the liquids may be contemplated. However, controlling the internal pressure at the time of attaching the plurality of fastening units to the main body substrate is attended by technical difficulties.

Thus, there is a need for an optical device and an electronic apparatus which are durable and in which deterioration of sealing performance for liquids contained therein can be prevented from occurring.

There is another need for a method of manufacturing an optical device in which deterioration of sealing performance for liquids contained therein can be obviated.

In order to fulfill the above-mentioned needs, according to one embodiment, there is provided an optical device including a first main body, a second main body, a third main body, a lens surface, and a jig.

The first main body has a pair of first peripheral parts parallel to a first direction and a first engaging part provided in the first peripheral part, constitutes a part on a light incidence side, and is light-transmitting.

The second main body has a second peripheral part parallel to the first direction and a second engaging part provided in the second peripheral part, constitutes a part on a light outgoing side, and is light-transmitting.

The third main body is stacked between the first main body and the second main body in a second direction orthogonal to the first direction, and defines a liquid chamber between the first main body and the second main body.

The lens surface is formed by an interface between a plurality of liquids different in refractive index and sealed in the inside of the liquid chamber, and is electrically deformable.

The jig has a third engaging part for engagement with the first engaging part, a fourth engaging part for engagement with the second engaging part, and a connection part for interconnecting the third engaging part and the fourth engaging part, the connection part having guide surfaces for guiding the first engaging part and the second engaging part to positions for engagement with the third engaging part and the fourth engaging part, and clamps the mutually stacked first main body, second main body and third main body in the second direction by the third engaging part and the fourth engaging part.

Thus, according to an embodiment, the jig clamps the first main body, the second main body, and the third main body which are stacked on one another and provided with the lens surface therein, in a pinching or sandwiching manner in the second direction (stacking direction). Here, the third engaging part and the fourth engaging part by which the clamping is performed are interconnected. According to this configuration, the need for a plurality of jigs is eliminated, and durability of the optical device is enhanced, as compared with a configuration wherein the first main body, the second main body, and the third main body stacked on one another and provided with the lens surface therein are clamped in a pinched or sandwiched manner in the second direction (stacking direction) by a plurality of jigs.

In addition, the third engaging part for engagement with the first engaging part provided in the first peripheral part and the fourth engaging part for engagement with the second engaging part provided in the second peripheral part are parallel to each other in the first direction. According to this configuration, when the mutually stacked main bodies are moved while being guided by the guide surfaces of the connection part, the first and second engaging parts put into engagement with the third and fourth engaging parts, respectively, and the first, second and third main bodies are clamped in a pinched or sandwiched manner by the jig. Therefore, notwithstanding the structure wherein the need for a plurality of jigs is eliminated, it is unnecessary to prepare screws or the like for engagement. Accordingly, it is possible to reduce the number of component parts and to reduce cost.

The first main body may have a substrate constituting a wall surface of the liquid chamber, and a holder capable of accommodating a light source.

The first peripheral part may be provided in the holder (be provided as part of the holder).

Thus, according to an embodiment, the first main body having the substrate and the holder, the second main body and the third main body are engaged with the jig at the holder and the main bodies, and are clamped in a pinched or sandwiched manner in the second direction (stacking direction). Therefore, in clamping the substrate provided with a lens surface therein, the second main body and the third main body together with the holder in a pinching or sandwiching manner, there is no need for a plurality of jigs. Consequently, the total number of component parts of the optical device can be reduced, and the cost can be reduced.

The first engaging part may have a first engaging region for engagement with the third engaging part in the first direction and a second engaging region for engagement with the third engaging part in the second direction.

The first engaging part and the third engaging part may be positioned in both the first direction and the second direction.

Thus, according to an embodiment, the first engaging part and the third engaging part are engaged with each other in both the first direction and the second direction. Therefore, safety and durability of the optical device are further enhanced.

The holder may have a contact surface for contact with the substrate.

The first peripheral part may be included in a surface which is in a face-back relation with the contact surface of the holder.

Thus, according to an embodiment, the first engaging part provided in the holder (provided as part of the holder) is located on a plane parallel to a plane on which the substrate constituting a wall surface of the liquid chamber is located. Therefore, the engagement between the first engaging part of the holder and the third engaging part of the jig is conducted on the plane on which the first engaging part is located. Consequently, the mutually stacked first main body, second main body and third main body can be clamped in a pinched or sandwiched manner more durably.

The first main body may be a substrate constituting a wall surface of the liquid chamber.

The first peripheral part may be included in a surface which is in a face-back relation with a surface, constituting the liquid chamber, of the substrate.

Thus, according to an embodiment, the first engaging part provided in the substrate is located on a plane parallel to the plane on which the substrate constituting a wall surface of the liquid chamber is located. Therefore, the engagement between the first engaging part and the third engaging part of the jig is conducted on the plane on which the first engaging part is located. Consequently, the mutually stacked first main body, second main body and third main body can be clamped in a pinched or sandwiched manner more durably.

According to another embodiment, there is provided a method of manufacturing an optical device, including a step of stacking a light-transmitting first main body, a light-transmitting second main body, and a third main body so that the third main body is disposed between the first main body and the second main body, thereby forming a liquid chamber between the first main body and the second main body.

In the manufacturing method, a plurality of liquids different in refractive index are sealed in the inside of the liquid chamber so as to form an electrically deformable lens surface at an interface between the liquids.

Besides, the mutually stacked first main body, second main body and third main body are inserted into a jig along a direction orthogonal to the stacking direction.

By the jig, the mutually stacked first main body, second main body and third main body are clamped in a pinched or sandwiched manner in the stacking direction.

Thus, according to an embodiment, when the mutually stacked first main body, second main body and third main body are moved while being guided by guide surfaces of the connection part, the first and second engaging parts are brought into engagement with the third and fourth engaging parts, respectively, and the first, second and third engaging parts are clamped in a pinched or sandwiched manner by the jig. According to this manufacturing method, the engagement of the first, second and third engaging parts with the jig is realized by the movement of the main bodies along the guide surfaces of the connection part. Therefore, the assembling operation can be facilitated.

According to a further embodiment, there is provided an electronic apparatus which includes a casing and an optical device accommodated in the casing.

The optical device includes a first main body, a second main body, a third main body, a lens surface, and a jig.

The first main body has a pair of first peripheral parts parallel to a first direction and a first engaging part provided in the first peripheral part, constitutes a part on a light incidence side, and is light-transmitting.

The second main body has a second peripheral part parallel to the first direction and a second engaging part provided in the second peripheral part, constitutes a part on a light outgoing side, and is light-transmitting.

The third main body is stacked between the first main body and the second main body in a second direction orthogonal to the first direction, and defines a liquid chamber between the first main body and the second main body.

The lens surface is formed by an interface between a plurality of liquids different in refractive index and sealed in the inside of the liquid chamber, and is electrically deformable.

The jig has a third engaging part for engagement with the first engaging part, a fourth engaging part for engagement with the second engaging part, and a connection part for interconnecting the third engaging part and the fourth engaging part, the connection part having guide surfaces for guiding the first engaging part and the second engaging part to positions for engagement with the third engaging part and the fourth engaging part, and clamps the mutually stacked first main body, second main body and third main body in the second direction by the third engaging part and the fourth engaging part.

As above-mentioned, according to the optical device pertaining to an embodiment, durability can be secured, and deterioration of sealing performance for the liquids contained in the device can be prevented.

Besides, according to the method of manufacturing an optical device pertaining to an embodiment, deterioration of sealing performance for the liquids contained in the device can be prevented.

Additional features and advantages are described herein, and will be apparent from the following Detailed Description and the figures.

BRIEF DESCRIPTION OF THE FIGURES

FIG. 3 is an exploded perspective view of the liquid lens device;

DETAILED DESCRIPTION

Figure 1:
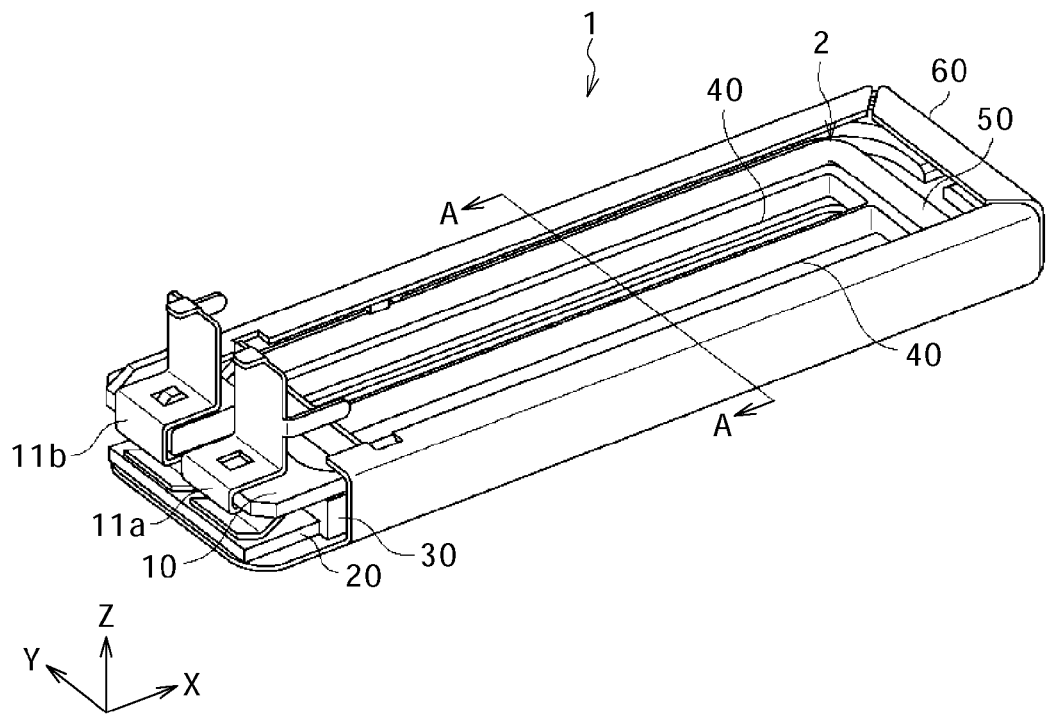
FIG. 1 is a perspective view of a liquid lens device according to a first embodiment.

The present application will be described below referring to the drawings according to an embodiment.
<First Embodiment>

In this embodiment, a liquid lens device will be described as an example of an optical device.

Figure 2:
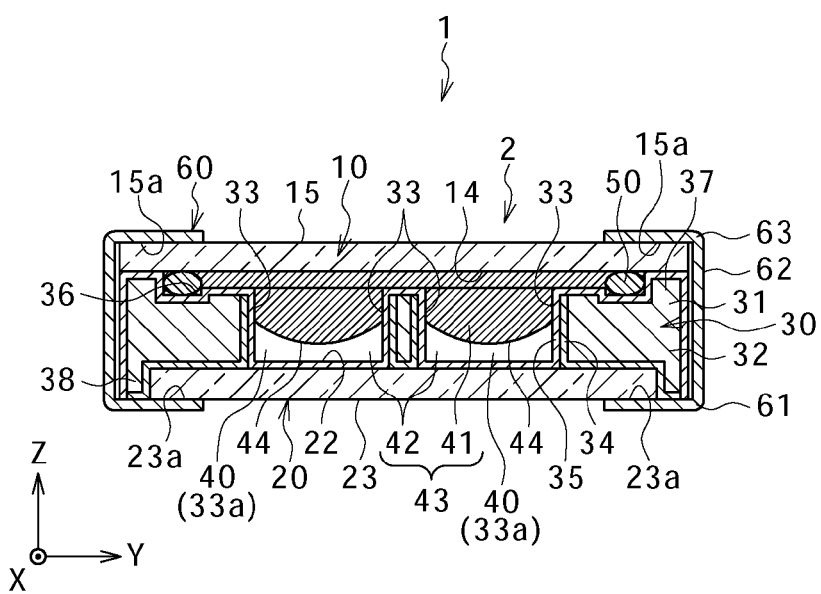
FIG. 2 is a sectional view of the liquid lens device, taken along line A-A of FIG. 1.

FIG. 1 is a perspective view of a liquid lens device 1 according to a first embodiment. FIG. 2 is a sectional view of the liquid lens device 1, taken along line A-A of FIG. 1.

As shown in these drawings, the liquid lens device 1 has a liquid lens element 2 which, for example, has an elongated rectangular shape, and a jig 60 for accommodating the liquid lens element 2. The liquid lens device 1 is a varifocal lens for a flashlamp device which is obtained by fixing the liquid lens element 2 by the jig 60 and which is used in an electronic apparatus such as a digital still camera.

Incidentally, in the following description, the longitudinal direction of the liquid lens element 2 having the elongated rectangular shape will in some cases be referred to as "X-axis direction" (first direction). The transverse direction of the liquid lens element 2 having the elongated rectangular shape will in some cases be referred to as "Y-axis direction." The direction in which substrates (described later) constituting the liquid lens element 2 are stacked will in some cases be referred to as "Z-axis direction" (second direction).

Configuration of Liquid Lens Element 2

FIG. 3 is an exploded perspective view of the liquid lens element 2.

The liquid lens element 2 is a lens element capable of exhibiting optical characteristics based on the electrowetting effect. The liquid lens element 2 has a first substrate 10 (first main body; substrate), a second substrate 20 (second main body), and a third substrate 30 (third main body). The liquid lens device 2 further has liquid chambers 40 capable of accommodating liquids therein, and a first liquid 41 and a second liquid 42 which are accommodated in the liquid chambers 40.

The first substrate 10 is a light-transmitting substrate which constitutes a pathway for incident light entering the liquid lens element 2. The first substrate 10 has a first principal surface part 14 constituting a surface of each of the liquid chambers 40, and a second principal surface part 15 being in a face-back relation with the first principal surface part 14. The first principal surface part 14 is provided with wiring (not shown) which can make contact with the first liquid 41. A terminal mount part 12 is provided at one end portion in the longitudinal direction (X-axis direction) of the first substrate 10. A terminal 11a for connecting the wiring, provided on the first principal surface part 14, to an external power source (not shown) is mounted to the terminal mount part 14. An end portion opposite to the end portion having the terminal mount part 12, of the first substrate 10, is provided with tapered parts 13, 13 at both corners thereof.

As above-mentioned, the liquid lens element 2 is accommodated in the jig 60. Here, of the first substrate 10, a region 15a (first peripheral part; first engaging part) in the periphery of the second principal surface part 15 is a region for engagement with the jig 60. Incidentally, this engagement will be described later.

The second substrate 20 is a light-transmitting substrate which constitutes a pathway for outgoing light from the liquid lens element 2. The second substrate 20 has a first principal surface part 22 constituting a surface of each of the liquid chambers 40, and a second principal surface part 23 which is in a face-back relation with the first principal surface part 22 and which constitutes the front surface side of the liquid lens element 2. The second substrate 20 is provided with tapered parts 21, 21 at positions corresponding to the tapered parts 13, 13 of the first substrate 10. The width of the second substrate 20 in the Y-axis direction is set to be smaller than the width of the first substrate 10 in the Y-axis direction.

Of the second substrate 20, a region 23a (second peripheral part; second engaging part) in the periphery of the second principal surface part 23 is a region for engagement with the jig 60. Incidentally, this engagement will be described in detail later.

Here, the first substrate 10 and the second substrate 20 may each be formed from a high-transparency material such as glass, ceramic, acrylic resin, etc. This makes it possible to reduce the transmission loss of intensity of the incident light or outgoing light. The first substrate 10 and the second substrate 20 may each be formed in a flat plate-like shape or, depending on optical characteristics, may be so formed that the main principal surface parts 15 and 23 have lens surfaces at their surfaces, respectively. In addition, a frame of a rib structure, for example, may be provided along the peripheral edge of each substrate so as to enhance strength.

The third substrate 30 is sandwiched between the first substrate 10 and the second substrate 20, to form the liquid chambers (described later) between the first substrate 10 and the second substrate 20.

The third substrate 30 has a first principal surface part 31 put in contact with the first substrate 10, and a second principal surface part 32 put in contact with the second substrate 20, the first and second principal surface parts 31 and 32 being in a face-back relation with each other. The third substrate 30 further has side walls 33 defining apertures 33a penetrating the first principal surface part 31 and the second principal surface part 32 thereof. The apertures 33a each having a rectangular shape, for example, are formed in plurality and in an arrayed form, that is, in parallel to each other.

An electrode layer 34 is provided on surfaces of the side walls 33 of the third substrate 30. An insulator layer 35 is provided on the electrode layer 34. The electrode layer 34 constitutes an electrode permitting connection of the liquid lens element 2 to an external power source. The insulator layer 35 obviates electrical contact between the electrode layer 34 and the first liquid 41 when a voltage is impressed.

The first principal surface part 31 of the third substrate 30 is provided with an annular groove 36 in such a form as to surround the plurality of apertures 33a. An annular elastic member 50 is accommodated in the groove 36. The elastic member 50 is a member for sealing the third substrate 30 and the first substrate 10 in a liquid-tight manner. A substantially annular projected part 37 is provided along the outer periphery of the annular groove 36. The first substrate 10 is mounted in contact with a surface constituting the tip of the projected part 37. The third substrate 30 has a plan-view shape substantially the same as that of the first substrate 10. Therefore, the first substrate 10 is mounted on the tip of the projected part 37 of the third substrate 30 so that side surfaces of the first substrate 10 are flush with side surfaces of the third substrate 30. In addition, the projected part 37 is provided with a cutout 37a for adjusting an internal pressure.

The second principal surface part 32 of the third substrate 30 is provided with a substantially annular projected part 38 for defining a recess. The second substrate 20, which is formed to be smaller than the first substrate 10 in width in the Y-axis direction, is put in contact with and accommodated in the recess defined by the projected part 38. The height of the projected part 38 in the Z-axis direction is equal to the thickness of the second substrate 20. When the second substrate 20 is accommodated in the recess, therefore, the second principal surface part 23 of the second substrate 20 and the tip surface of the projected part 38 are flush with each other.

The third substrate 30 is provided with a terminal mount part 39a at an end portion located at one end in the longitudinal direction thereof. A terminal 11b for connecting the electrode layer 34 to an external power source is mounted to the terminal mount part 39a. The terminal mount part 39a may be provided with an engaging part 39b capable of engagement with an opening formed in the terminal 11b. The terminal mount part 39a is provided at such a position as not to interfere with the terminal mount part 12 of the first substrate 10. A wiring for connection with the electrode layer 34 is formed at the terminal mount part 39a. Of the third substrate 30, an end portion opposite to the end having the terminal mount part 39a is provided with tapered parts 39, 39 at both corners thereof.

Here, the third substrate 30 may be a substrate formed by molding a resin. Or, alternatively, a substrate formed from such a material as metal, glass, ceramic, etc. may be used as the third substrate 30. Or, further, the third substrate 30 may be composed of a plurality of materials, such as those obtained from a metallic part or parts and a resin which are united by insert molding.

The elastic member 50 is formed from such a material as elastomer, synthetic resin, etc.

The electrode layer 34 is a water-repellent thin film formed from Parylene (a p-xylylene resin), inorganic material or the like by CVD (chemical vapor deposition) or the like.

Incidentally, while the third substrate 30 is formed with the plurality of apertures 33a in parallel to each other, or in an arrayed fashion, this configuration is not limitative; for example, a single aperture 33a may be used alone. Besides, the shape of the apertures 33a is not limited to the rectangular shape shown in the drawing; for example, the shape may be a circle, a polygon, an annular shape, or the like.

The first substrate 10, the third substrate 30, and the second substrate 20 are stacked on one another in this order from the light incidence side toward the light outgoing side. More specifically, the first substrate 10 is put in contact with and mounted on the first principal surface part 31 of the third substrate 30, with the elastic member 50 accommodated in the groove 36 therebetween. On the other hand, the second substrate 20 is put in contact with and mounted on the substantially annular projected part 38 of the second principal surface part 32 of the third substrate 30. As a result, the liquid chambers 40 are defined by the first principal surface part 14 of the first substrate 10, the side walls 33 of the apertures 33a provided in the third substrate 30, and the first principal surface part 22 of the second substrate 20.

The first liquid 41 and the second liquid 42 are sealed, in mutually separated state, in each of the liquid chambers 40.

The first liquid 41 is a transparent liquid which is electrically conductive or polar. For example, an aqueous lithium chloride solution (3.36 wt %, absolute refractive index: 1.34) can be used as the first liquid 41. Or, alternatively, pure water, electrolytes, alcohols, normal-temperature molten salts and the like can also be used as the first liquid 41.

The second liquid 42 is an insulating, transparent nonaqueous liquid, and has an absolute refractive index higher than that of the first liquid 41. Examples of the material which can be used as the second liquid 42 include hydrocarbons, hydrophilic silicone oils, and fluorine-containing materials. Incidentally, in the following description, the first liquid 41 and the second liquid 42 will be generically referred to as the liquid 43.

A liquid-liquid interface 44 (lens surface) having a curved surface shape, for example, is formed at the interface between the first liquid 41 and the second liquid 42 due to the interfacial tension between the first liquid 41 and the second liquid 42 and the interfacial tension between the first and second liquids 41, 42 and the insulator layer 35. When light enters the liquid 43, the light is refracted at the liquid-liquid interface 44 under a lens effect arising from the fact that the first liquid 41 has an absolute refractive index higher than that of the second liquid 42.

Here, when a voltage is impressed on the wiring formed on the first substrate 10 and the electrode layer 34 by an external power source, electric charges are accumulated on the first liquid 41 and the electrode layer 34. Due to the mutual attraction of the electric charges, the interfacial tension between the first liquid 41 and the insulator layer 35 on the electrode layer 34 is varied, whereby the shape of the liquid-liquid interface 44 is changed (electrowetting effect). According to this liquid lens element 2, due to the difference in absolute refractive index between the first liquid 41 and the second liquid 42, the optical characteristics exhibited when the voltage is impressed and the optical characteristics exhibited when no voltage is impressed are different from each other.

More specifically, when a voltage is impressed on the electrode layer 34, electric charges are accumulated in the vicinity of the insulator layer 35, and the affinity of the first liquid 41 for the insulator layer 35 is enhanced. As a result, the liquid-liquid interface 44 becomes convex relative to the second substrate 20, so that it becomes possible to converge light.

Configuration of Jig 60

Now, the jig 60 in which to accommodate the liquid lens element 2 configured as above will be described below.

Figure 4:
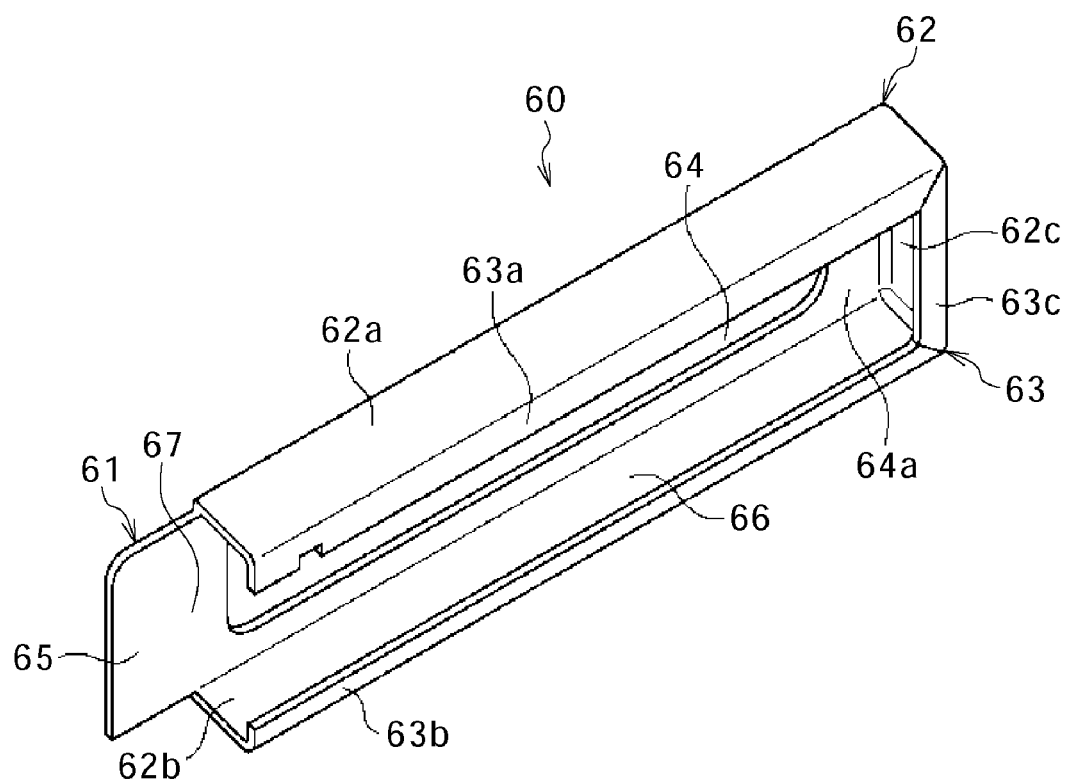
FIG. 4 is a perspective view of a jig.
Figure 4:
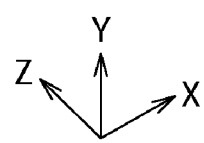

FIG. 4 is a perspective view of the jig 60.

As shown in the figure, the jig 60 has a main plate 61, side plates 62, and projected parts 63. The jig 60 is formed, for example, from a metal, a synthetic resin or the like. The jig 60 is formed, for example by punching a metallic sheet into a predetermined shape by pressing, and bending the punched sheet into a box-like shape.

The main plate 61 is a rectangular annular flat plate-like member, and has an outer circumference which is substantially the same as that of the liquid lens element 2 in the X-axis direction and the Y-axis direction. An aperture provided inside the main plate 61 constitutes a light passage region 64 through which light passing through the liquid lens element 2 can pass. The light passage region 64 has a shape substantially the same as the overall shape of the plurality of apertures 33a in the third substrate 30.

The main plate 61 is provided with a part 65 adjacent to the light passage region 64 in the Y-axis direction. The terminal 11a mounted to the terminal mount part 12 of the first substrate 10 and the terminal 11b mounted to the terminal mount part 39a of the third substrate 30 are disposed on the second substrate 20. The part 65 receives a pressure exerted on the second substrate 20, to support the second substrate 20.

The region 23a (second peripheral part; second engaging part) of the second substrate 20 of the liquid lens element 2 is engaged with a part 64a (fourth engaging part), located at the outer periphery of the light passage region 64, of the main plate 61. The region 23a, specifically, is a region put in contact with the part 64a.

The side plates 62 (62a, 62b, and 62c) (connecting parts) have three flat plate-like parts (62a, 62b, and 62c) provided to project in the Z-axis direction from the peripheral edges of the main plate 61 exclusive of the part 65.

The side plates 62a and 62b have the same rectangular shape, and are provided at peripheral edge parts extending in the X-axis direction of the main plate 61, in parallel to each other and so as to face each other. The length of the side plates 62 in the Z-axis direction is substantially equal to the height of the liquid lens element 2 in the Z-axis direction (stacking direction).

The inside surfaces of the side plates 62a and 62b provided to project in the Z-axis direction orthogonal to the surface directions (plane) of the main plate 61 function as guide surfaces during when the liquid lens element 2 is accommodated into the jig 60.

The side plate 62c is provided at a peripheral portion opposite to the part 65 in the longitudinal direction of the main plate 61. The side plate 62c is adjacent to and orthogonal to the side plates 62a and 62b, and spatially connects the side plates 62a and 62b to each other.

The projected parts 63 (63a, 63b, and 63c) have an outer periphery which is substantially the same as that of the part 64a located along the outer periphery of the light passage region 64 of the main plate 61, and are disposed on a plane parallel to the plane in which the main plate 61 is located. Specifically, the projected parts 63 are provided to project from end portions, opposite to end portions continuous with the main plate 61, of the side plates 62 so as to face the main plate 61. The projected parts 63 have three flat plate-like parts (63a, 63b, and 63c) provided to project from the projected tip portions of the side plates 62a, 62b, and 62c in mutually orthogonal directions. The projected parts 63a and 63b are provided to be continuous with the side plates 62a and 62b, respectively. Projected tip portions of the projected parts 63a and 63b are opposed to each other on a plane parallel to the main plate 31, with a space therebetween. The projected part 63c is provided to be continuous with the side plate 62c, and is adjacent to the projected parts 63a and 63b on a plane determined by the X-axis and the Y-axis. The region surrounded by the projected tip portions of the projected parts 63a, 63b, and 63c constitute a light passage region 66 through which the light passing through the liquid lens element 2 can pass. The light passage region 66 is opposed to the light passage region 64 configured by the aperture in the main plate 61.

A region 15a (first peripheral part; first engaging part) of the first substrate 10 of the liquid lens element 2 is engaged with the projected parts 63a, 63b, and 63c (third engaging part). The region 15a, specifically, is a region put into contact with the projected parts 63a, 63b, and 63c.

A surface or side opposed to the projected part 63c in the Y-axis direction is an open end 67. The open end 67 functions as an insertion port at the time of accommodating the liquid lens element 2 into the jig 60.

Accommodation of Liquid Lens Element 2 into Jig 60

The liquid lens device 1 is obtained by accommodating the liquid lens element 2 into the jig 60, as above-mentioned. Here, the liquid lens element 2 is accommodated into the jig 60 in the following manner.

The liquid lens element 2 is inserted into the jig 60 through the open end 67 serving as an insertion port, and is slid in the X-axis direction. In this instance, the liquid lens element 2 is inserted into the jig 60 in such a manner that its parts provided with the tapered parts 13, 21, and 29 serve as a leading end in insertion. In this case, of the second substrate 20 of the liquid lens element 2, the region 23a in the peripheral portion of the second principal surface part 23 makes contact with the main plate 61 of the jig 60. In addition, of the first substrate 10, the region 15a in the peripheral portion of the second principal surface part 15 makes contact with the projected parts 63.

The liquid lens element 2 inserted into the jig 60 through the open end 67 as above is further slid in the X-axis direction within the jig 60 while being guided by the inside surfaces of the side plates 62a and 62b of the jig 60 which function as guide surfaces. When the leading end in insertion of the liquid lens element 2 comes into abutment with the side plate 62c located at the end portion in the X-direction of the jig 60, the sliding is finished.

Here, the region 23a (second peripheral part; second engaging part) in the peripheral portion of the second principal surface part 23 of the second substrate 20 of the liquid lens element 2 is engaged with the part 64a (fourth engaging part) located at the outer periphery of the light passage region 64 of the main plate 61 of the jig 60. Incidentally, the projected part 38 of the third substrate 30 is also engaged with the part 64a of the main plate 61.

In addition, the region 15a (first peripheral part; first engaging part) in the peripheral portion of the second principal surface part 15 of the first substrate 10 of the liquid lens element 2 is engaged with the projected parts 63 (third engaging part) of the jig 60.

Here, the elastic member 50 provided between the first substrate 10 and the third substrate 30 is compressed between the substrates 10 and 30, and closes the liquid chambers 40 in a liquid-tight fashion by its repellent force. Simultaneously, the jig 60 clamps the liquid lens element 2 in a nipping or sandwiching manner in the Z-axis direction under the repellent force of the elastic member 50. As a result, the liquid lens element 2 is fixed to the jig 60.

This provides the liquid lens device 1 in which the liquid lens element 2 is assuredly fixed to the jig 60, without slipping off from the jig 60. In this liquid lens device 1, the second substrate 20 of the liquid lens element 2 is exposed through the light passage region 64 of the jig 60, so that light is permitted to be incident, through the second substrate 20, on the liquid-liquid interface 44 (lens surface) of the liquid 43 contained in the liquid lens device 1.

According to the liquid lens device 1 in this embodiment, the liquid lens element 2 is held and fixed by only the single jig 60. The jig 60 is engaged with the second substrate 20 of the liquid lens element 2 at its main plate 61, and is engaged with the first substrate 10 of the liquid lens element 2 at its projected parts 63.

This results in that while clamping the mutually stacked substrates 10, 30, and 20 in a nipping or sandwiching manner in the Z-axis direction, the jig 60 holds the liquid lens element 2 in the manner of surrounding the peripheral surfaces of the liquid lens element 2 from the four sides composed of the mutually opposed main plate 61 and projected parts 63 and the side plates 62 interconnecting the main plate 61 and the projected parts 63.

According to the configuration as above, the jig 60 clamps the liquid lens element 2 in a sandwiching manner in the Z-axis direction, so that the durability of the liquid lens device 1 is enhanced as compared with a configuration wherein the substrates on the face and back sides of the liquid lens element 2 are held by a plurality of jigs.

Further, since the jig 60 are not engaged directly with the first substrate 10 and the second substrate 20 which are each formed of glass or the like, there is little possibility of local concentration of stress into a partial region or regions of the first substrate 10 and the second substrate 20. This ensures that the first substrate 10 and the second substrate 20 will not easily be damaged, and safety of the liquid lens device 1 can be enhanced.

In addition, according to the liquid lens device 1 in this embodiment, the first substrate 10 and the second substrate 20 are fixed in the state of being clamped by the jig 60 in a nipping or sandwiching manner while receiving the repellent force of the elastic member 50.

The repellent force of the elastic member 50 enables assured fixation of the liquid lens element 2 onto the jig 60, notwithstanding the jig 60 is a single member.

Besides, the elastic member 50 is a member for sealing the liquid 43 within the liquid chambers 40. Therefore, the sealing of the liquid 43 and the holding and fixation of the liquid lens element 2 are realized by the single member, so that an assembling work is extremely easy to carry out. Furthermore, since it is unnecessary to prepare fixing screws or the like, the number of component parts is reduced, and a lowing in const can be achieved.

Method of Manufacturing Liquid Lens Device 1

Now, a method of manufacturing a liquid lens device 1 will be described below.

Figure 5:
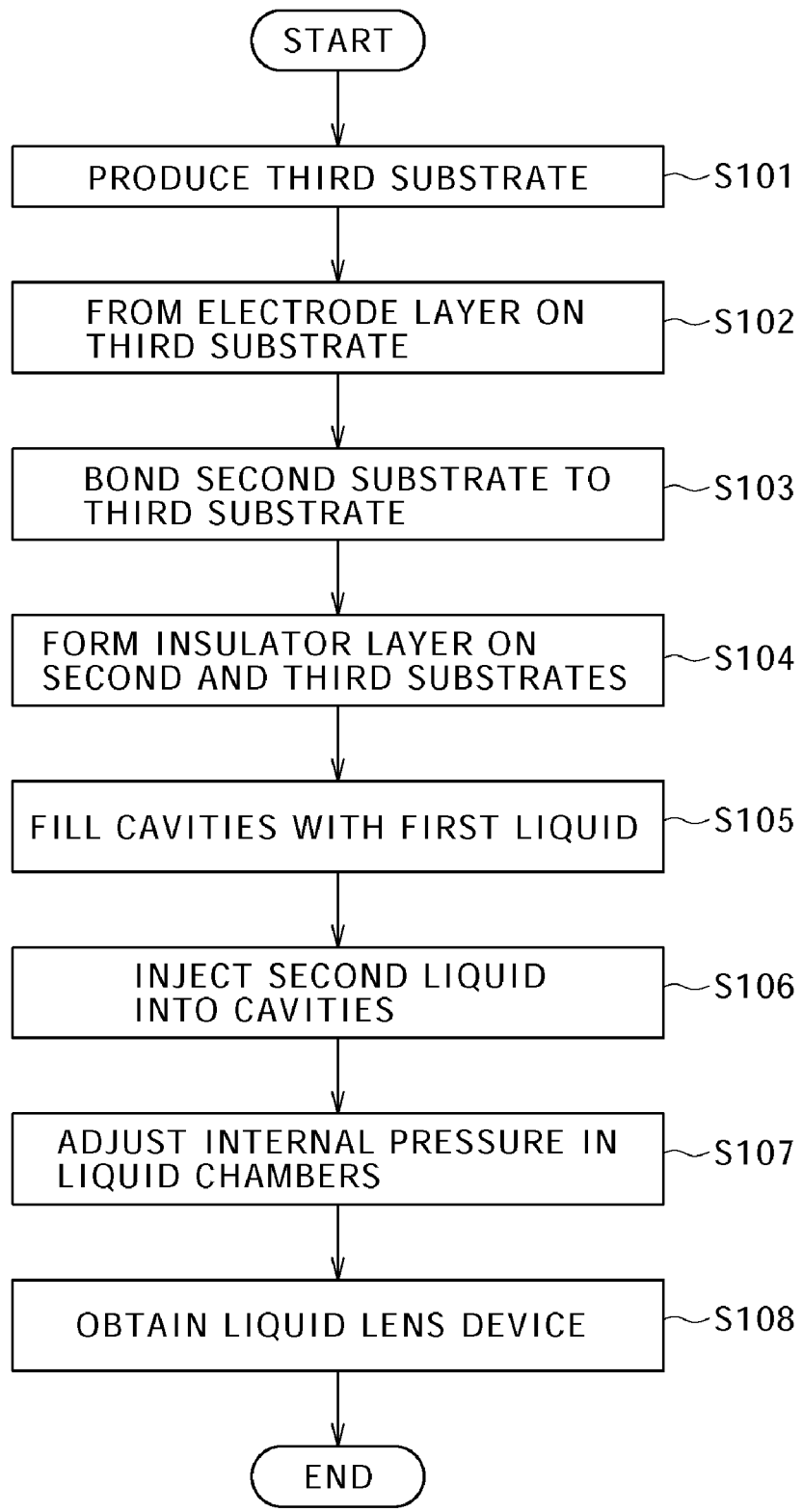
FIG. 5 is a flow chart for a method of manufacturing a liquid lens device.

FIG. 5 is a flow chart illustrating the method of manufacturing the liquid lens device 1. FIGS. 6 to 13 are schematic views illustrating manufacturing steps in the method of manufacturing the liquid lens device 1.

Figure 6:
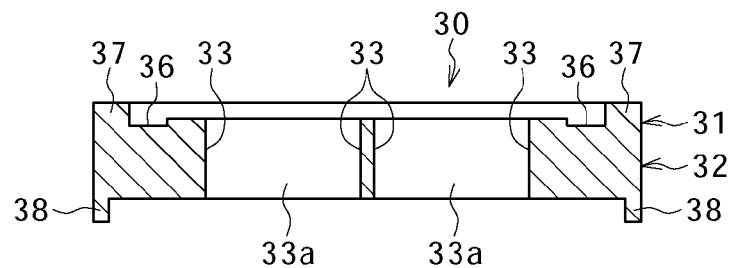
FIG. 6 is a schematic view of a third substrate.

For example, by molding a resin or the like material, a third substrate 30 shown in FIG. 6 is formed (step S101). Here, the third substrate 30 is provided with side walls 33 defining a plurality of apertures 33a penetrating a first principal surface part 31 and a second principal surface part 32 which are in a face-back relation with each other. The first principal surface part 31 is formed with an annular groove 36 such as to surround the plurality of apertures 33a. Along the outer periphery of the annular groove 36, a substantially annular projected part 37 is provided which has a cutout 37a (shown in FIG. 3) for adjusting the internal pressure. The second principal surface part 32 is provided with a substantially annular projected part 38 defining a recess.

Figure 7:
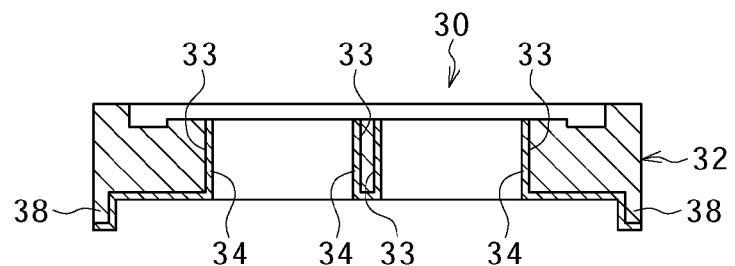
FIG. 7 is a schematic view showing the condition where an electrode layer is formed on the third substrate.

As shown in FIG. 7, an electrode layer 34 is formed on the surfaces of the side walls 33 by such a method as sputtering, vapor deposition, and plating (step S102). Or, alternatively, the electrode layer 34 may be formed by adhesion of an electrode sheet. It suffices for the electrode layer 34 to be formed at least in regions for making contact with a liquid 43 to be sealed later. In addition, if necessary, a reflective film may be formed on the second principal surface part 32 by a material based on aluminum, aluminum-silicon, silver or the like, for enhancing reflectivity. The reflective film and the electrode layer 34 may be formed integrally.

Figure 8:
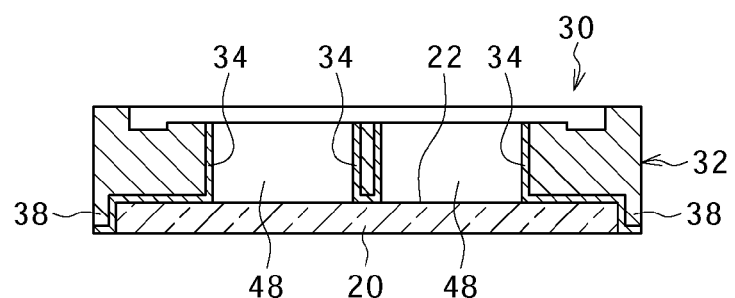
FIG. 8 is a schematic view showing the condition where a second substrate is accommodated in the third substrate.

As shown in FIG. 8, the second substrate 20 is accommodated inside the substantially annular projected part 38 provided on the second principal surface part 32 of the third substrate 30 and is bonded to the third substrate 30 (step S103). More specifically, the first principal surface part 22 of the second substrate 20 is brought into contact with the second principal surface part 32 of the third substrate 30 through the electrode layer 34, and side surface parts of the second substrate 20 are brought into contact with the projected parts 38 provided on the second principal surface part 32 through the electrode layer 34. In this condition, the second substrate 20 is bonded to the third substrate 30. As a result, cavities 48 in which the liquid 43 can be contained are defined by side walls 33 of the apertures 33a provided in the third substrate 30 and the first principal surface part 22 of the second substrate 20.

Incidentally, it suffices for the bonding to be carried out by a method free of possibility of liquid leakage, such as adhesion, diffusion bonding, ultrasonic fusing or thermocompression bonding. Or, alternatively, caulking through an elastic member (not shown), screwing, or the like may also be adopted, to thereby mechanically fix the second substrate 20 to the third substrate 30. Further, the third substrate 30 and the second substrate 20 may be formed integrally, for example, by molding a transparent resin.

Figure 9:
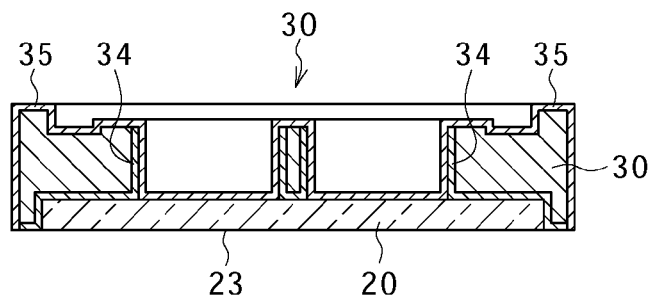
FIG. 9 is a schematic view showing the condition where an insulator layer is formed on the third substrate and the second substrate.

As shown in FIG. 9, an insulator layer 35 having water repellency is formed on the mutually bonded third substrate 30 and second substrate 20 by CVD or the like (step S104). The insulator layer 35 is formed on the whole surface of the assembly, exclusive of the second principal surface part 23 of the second substrate 20.

Figure 10:
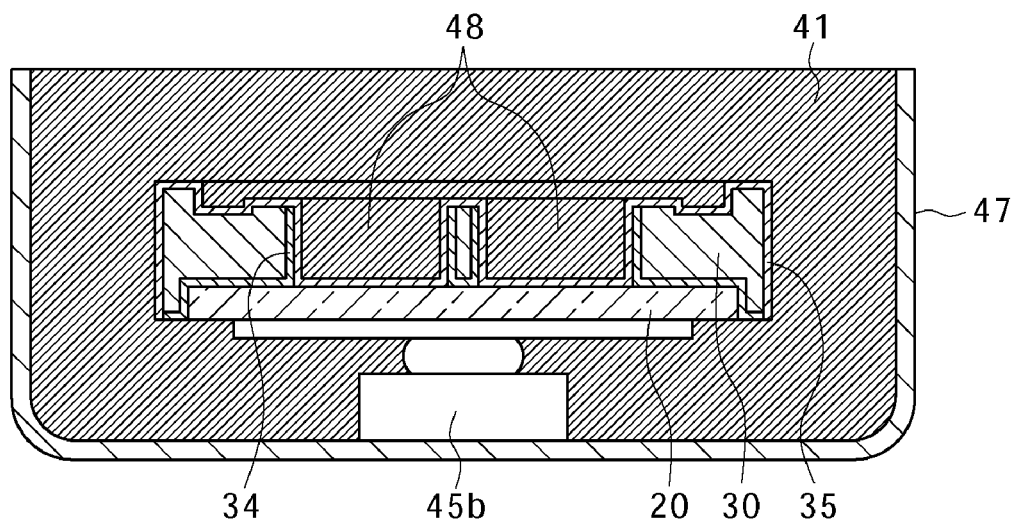
FIG. 10 is a schematic view showing the condition where cavities are filled with a first liquid.

As shown in FIG. 10, the third substrate 30 and the second substrate 20 mutually bonded and provided thereon with the insulator layer 35 are immersed in a first liquid 41 placed in a tank 47, and mounted on a clamp 45b disposed inside the tank 47, whereby the cavities 48 are filled with the first liquid 41 (step S105). As the clamp 45b, for example, a clamp having a spring property in the Z-axis direction is used.

Figure 11:
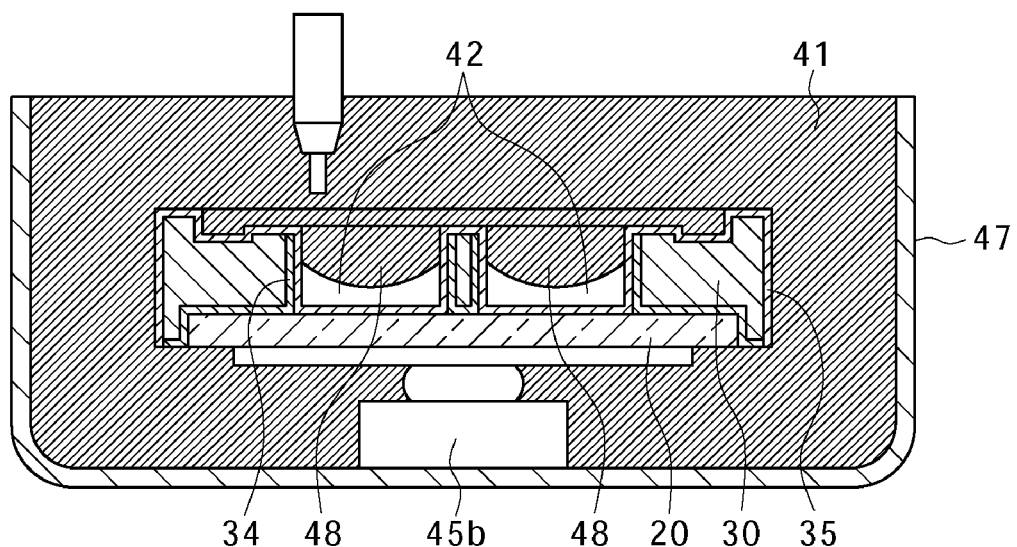
FIG. 11 is a schematic view showing the condition where a second liquid is injected into the cavities.

As shown in FIG. 11, a desired amount of a second liquid 42 is injected into each of the cavities 48 filled with the first liquid 41 (step S106). Here, since the insulator layer 35 has water repellency as above-mentioned, the affinity of the second liquid 42 for the insulator layer 35 is higher than the affinity of the first liquid 41 for the insulator layer 35. Therefore, the second liquid 42 spreads on and wets the wall surfaces of the cavities 48 according to the water repellency of the insulator layer 35.

Subsequently, the elastic member 50 and the first substrate 10 are placed on the third substrate 30. More specifically, the elastic member 50 is accommodated in the annular groove 36 provided in the first principal surface part 31 of the third substrate 30, and the first substrate 10 is mounted on the elastic member 50.

Figure 12A:
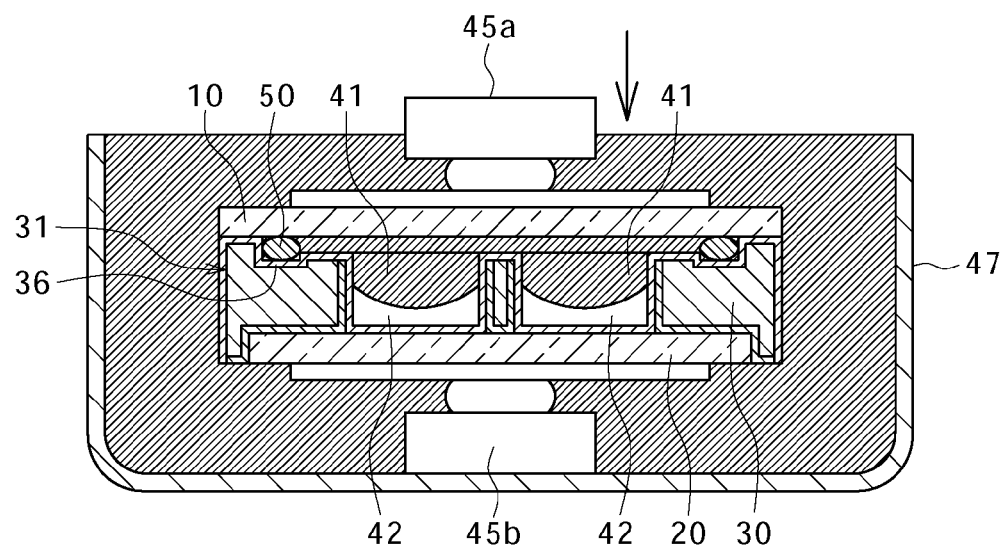
FIGS. 12A and 12B are schematic views showing the condition where clamps are disposed on a liquid lens element.

As shown in FIG. 12A, a clamp 45a is placed on the first substrate 10, in the manner of being opposite to the clamp 45b. Like the clamp 45b, the clamp 45a also has a spring property in the Z-axis direction. By the clamps 45a and 45b, the first substrate 10 is fixed under pressure, while compressing the elastic member 50. Here, the sealing property for the liquid chambers 40 is adjusted by compressing the elastic member 50 in a desired extent.

In this instance, a liquid drain pin (not shown) is inserted into the cutout 37a in the third substrate 30. The amount of the first liquid 41 sealed in each of the liquid chambers 40 is regulated by use of the liquid drain pin, thereby adjusting the internal pressure in the liquid chambers 40 (step S107). The liquid drain pin is pulled out when the internal pressure inside the liquid chambers 40 has reached a desired value, whereon a liquid lens element 2 having desired lens characteristics is obtained.

Figure 12B:
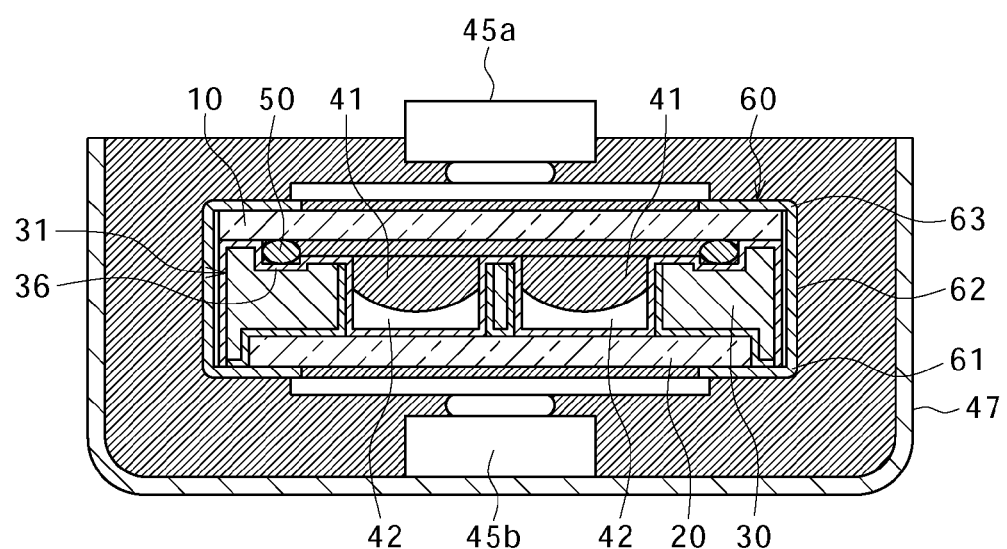

As shown in FIG. 12B, the jig 60 is attached to the liquid lens element 2 in the condition where the first substrate 10 is pressed by the clamps 45a and 45b (step S108). Specifically, the jig 60 is fitted onto the liquid lens element 2, which is fixed to a desired thickness by the clamps 45a and 45b, starting from the open end 67, and the jig 60 is slid in the X-axis direction. In this instance, the main plate 61 and end portions of the projected parts 63a and 63b on the side of the open end 67 of the jig 60 abut on the clamps 45a and 45b, respectively. The main plate 61 and the projected parts 63a and 63b of the jig 60 push open the clamps 45a and 45b in the Z-axis direction by utilizing the spring property of the latter. As a result, the main plate 61 of the jig 60 enters into the gap between the clamp 45b and the second substrate 20. Similarly, the projected parts 63a and 63b of the jig 60 also enter into the gap between the clamp 45a and the first substrate 10. Consequently, under the repellent force of the elastic member 50, the main plate 61 is pressed against the second substrate 20, and the projected parts 63 are pressed against the first substrate 10. Accordingly, a liquid lens device 1 is obtained in which the liquid lens element 2 is assuredly fixed to the jig 60, without slipping off from the jig 60.

As a result, the liquid lens element 2 can be accommodated in the jig 60 while maintaining the internal pressure and the thickness of the liquid lens element 2 fixed under pressure and adjusted by the clamps 45a and 45b, and, hence, a liquid lens device 1 having desired lens characteristics can be obtained.

Finally, the clamps 45a and 45b are removed from the liquid lens device 1 obtained, and the liquid lens device 1 is taken out of the tank 47 and washed.

Incidentally, while the clamps 45a and 45b having the spring property in the Z-axis direction are used in this embodiment, this configuration is not limitative. For example, when spherical clamps are used, the areas of contact of the clamps with the liquid lens element 2 are small, so that interference between the clamps and the jig 60 can be suppressed, which naturally is advantageous.

In place of the above-mentioned sequence of manufacturing steps, the liquid lens element 2 in the state of being pressed by the clamps 45a and 45b may be taken out of the tank 47 and washed, followed by accommodating the liquid lens element 2 into the jig 60, thereby to obtain the liquid lens device 1.

According to the method of manufacturing the liquid lens device 1 in this embodiment, in step S107 the elastic member 50 is compressed in a desired extent by the clamps 45, whereby the sealing performance for the liquid chambers 40 is adjusted. Simultaneously, the quantity of the first liquid 41 sealed within the liquid chambers 40 is regulated by use of the liquid drain pin, thereby adjusting the internal pressure in the liquid chambers 40.

According to this manufacturing method, the internal pressure in the liquid chambers 40 can be adjusted at the time of controlling the sealing performance for the liquid 43. Therefore, it is possible to realize a good sealing performance while maintaining a desired internal pressure.

In addition, the adjustment of the internal pressure is carried out in the tank 47, without taking out of the tank 47 from the liquid lens element 2 before the liquid lens element 2 is clamped by the jig 60 in a pinching or sandwiching manner. This reduces the possibility that the operation of sealing the liquid 43 might be influenced by temperature variations, external pressure variations or the like in the inside or the outside of the tank 47. Therefore, there is little risk of variations of the internal pressure in the liquid chambers 40 arising from such variations in the ambient conditions. Consequently, it is possible to reduce deterioration of the sealing performance for the liquid 43.

According to the method of manufacturing the liquid lens device 1 in this embodiment, in step S108 the jig 60 pushes open the clamps 45a and 45b in the Z-axis direction while utilizing the spring property of the clamps. As a result, the jig 60 enters into the gaps between the clamps 45a, 45b and the liquid lens element 2. This ensures that the main plate 61 is pressed against the second substrate 20 and the projected parts 63 are pressed against the first substrate 10, under the repellent force of the elastic member 50.

According to this manufacturing method, it is possible to contain the liquid lens element 2 into the jig 60 while maintaining the internal pressure and the thickness of the liquid lens element 2 which are adjusted through pressing and fixing by the clamps 45a and 45b.

According to the manufacturing method, further, the liquid lens element 2 is fixed by the jig 60 under the repellent force of the elastic member 50. At the same time, the liquid 43 is assuredly sealed in the liquid chambers 40 of the liquid lens element 2.

Consequently, holding and fixing of the liquid lens element 2 are realized by the insertion of the liquid lens element 2 into the jig 60. Accordingly, it is unnecessary to use screws or the like, and the assembling operation is facilitated.

Modification

The configuration for fixing the liquid lens element 2 to the jig 60 is not limited to the above-mentioned configuration. For example, the liquid lens element 2 and the jig 60 may be formed in the following manner.

For instance, the side plates 62a and 62b of the jig 60 may be provided with cutouts at desired positions, and lock members capable of engagement with the cutouts may be provided at those portions of the third substrate 30 which correspond to the cutouts. Each of the lock members may have such an inclination that its sectional area as viewed in the insertion direction of the liquid lens element 2 is gradually increased along the insertion direction. The lock members of the third substrate 30 of the liquid lens element 2 are engaged with the cutouts in the jig 60, whereby the liquid lens element 2 is restrained from slipping off from the jig 60. Incidentally, the cutouts in the jig 60 are preferably provided with a desired play in relation to the lock members of the third substrate 30 so that pressure is not locally exerted on the liquid lens element 2 at the time of engagement and that the repellent force of the elastic member 50 can be exhibited.

Figure 13:
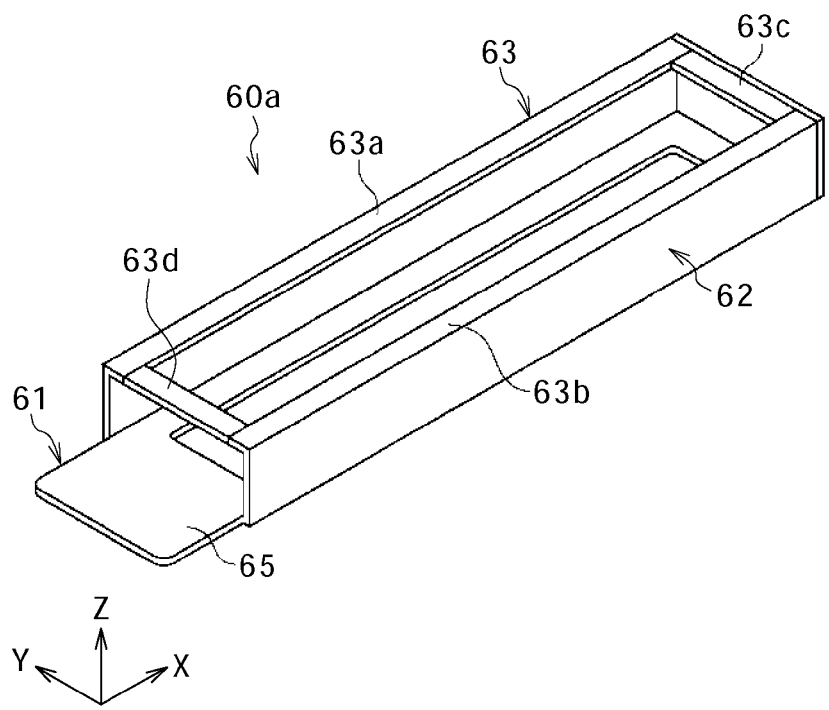
FIG. 13 is a perspective view of a modification of the jig.

Or, as shown for a jig 60a in FIG. 13, a projected part 63d for connecting the projected parts 63a and 63b may be provided at other end portion opposite, in the longitudinal direction, to the end portion where the projected part 63c is provided.

According to this configuration, the projected part 63 as a whole is annular in shape. Therefore, the jig 60a shows an enhanced durability, and the liquid lens device 1 is less susceptible to deformation or the like under the influence of disturbances.

Figure 14:
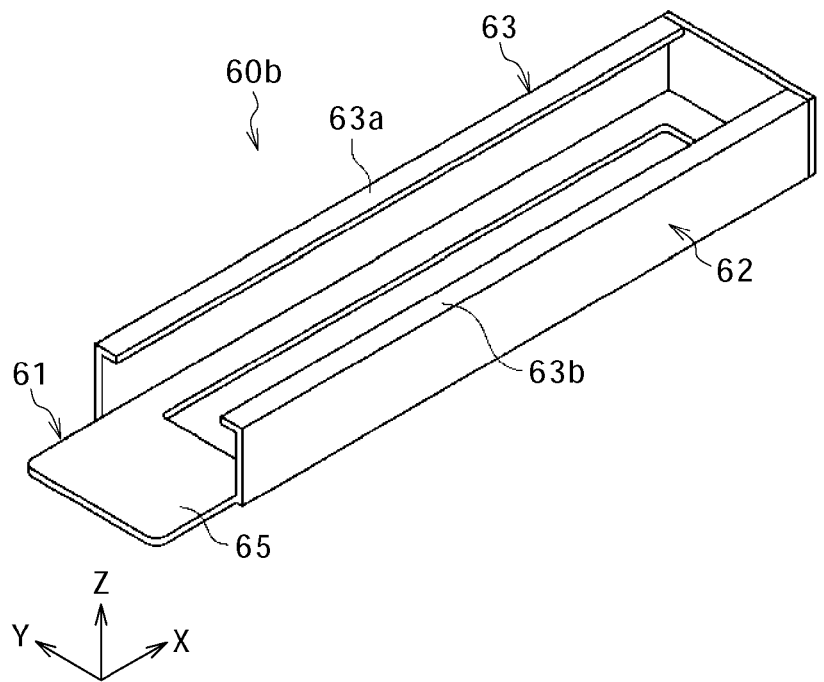
FIG. 14 is a perspective view of another modification of the jig.

Or, as shown for a jig 60b in FIG. 14, the projected part 63 may be composed only of the longitudinal projected parts 63a and 63b, by omitting the above-mentioned projected part 63c located at an end portion in the longitudinal direction.

According to this configuration, since the projected part 63c is absent, interference of the projected part 63c with the clamp 45a or the liquid lens element 2 at the time of sliding insertion of the liquid lens element 2 into the jig 60 is obviated. Therefore, assembleability of the first substrate 10 can be enhanced.

Figure 15:
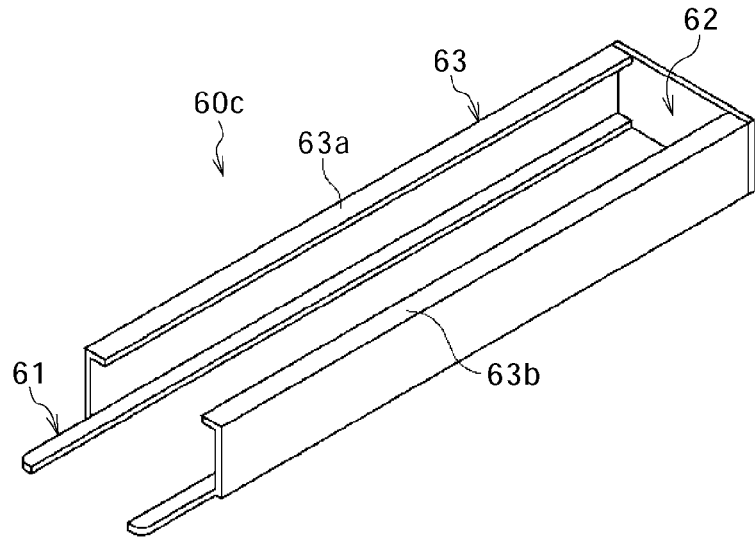
FIG. 15 is a perspective view of a further modification of the jig.
Figure 15:
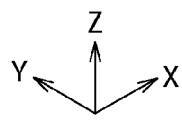

Or, as shown for a jig 60c in FIG. 15, the projected part 63 may be composed only of the projected parts 63a and 63b and, further, the main plate 61 may be composed only of parts opposed respectively to these projected parts 63a and 63b, instead of being formed in an annular shape. This jig 60c is composed of minimum required parts for ensuring that sliding insertion of the liquid lens element 2 into the jig 60c can be performed while positioning the liquid lens element 2 in three axial directions relative to the jig 60c.

Therefore, according to this jig 60c, a reduction in weight can be achieved without lowering the holding performance as to the liquid lens element 2. Furthermore, during when the liquid lens element 2 is mounted to the jig 60c in the state of being pressed by the clamps 45a and 45b, interference between the clamps 45a, 45b and the jig 60c can be restrained.

<Second Embodiment>

In this embodiment, an illuminator will be described as an example of the optical device.

In the following description, the same members and functions and the like as those in the optical device according to the above-described first embodiment will be denoted by the same reference symbols as used above, and descriptions of them will be simplified or omitted; thus, the following description will be centered on the differences of this embodiment from the first embodiment above.

Configuration of Illuminator 3

Figure 16:
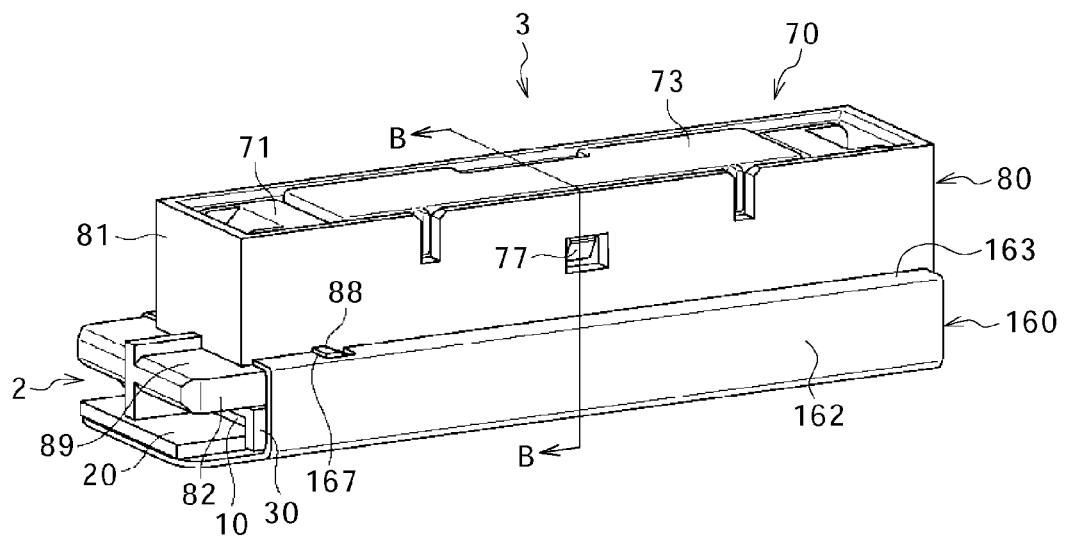
FIG. 16 is a perspective view of an illuminator according to a second embodiment.
Figure 16:
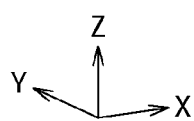
Figure 17:
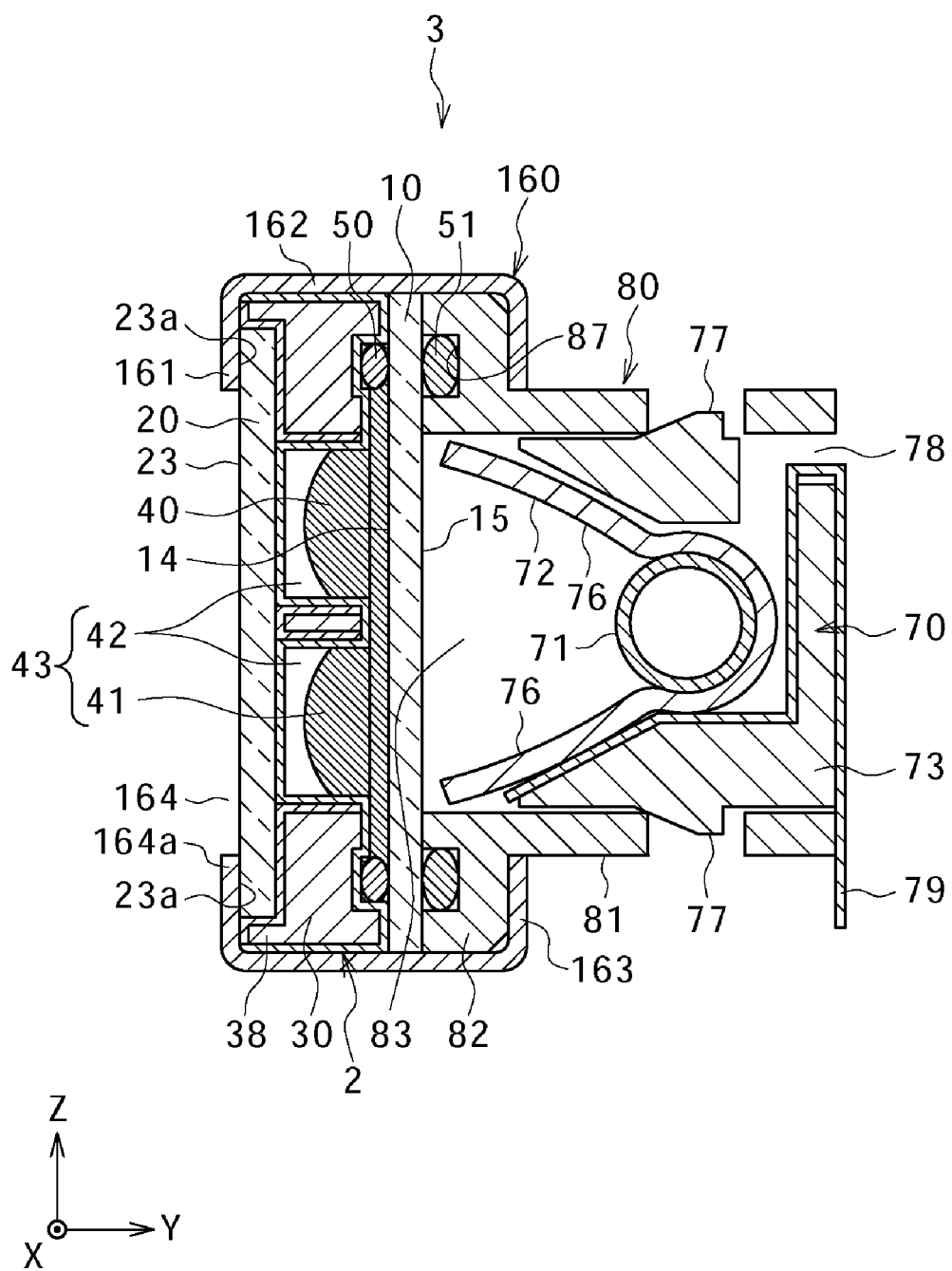
FIG. 17 is a sectional view of the illuminator, taken along line B-B of FIG. 16.
Figure 18:
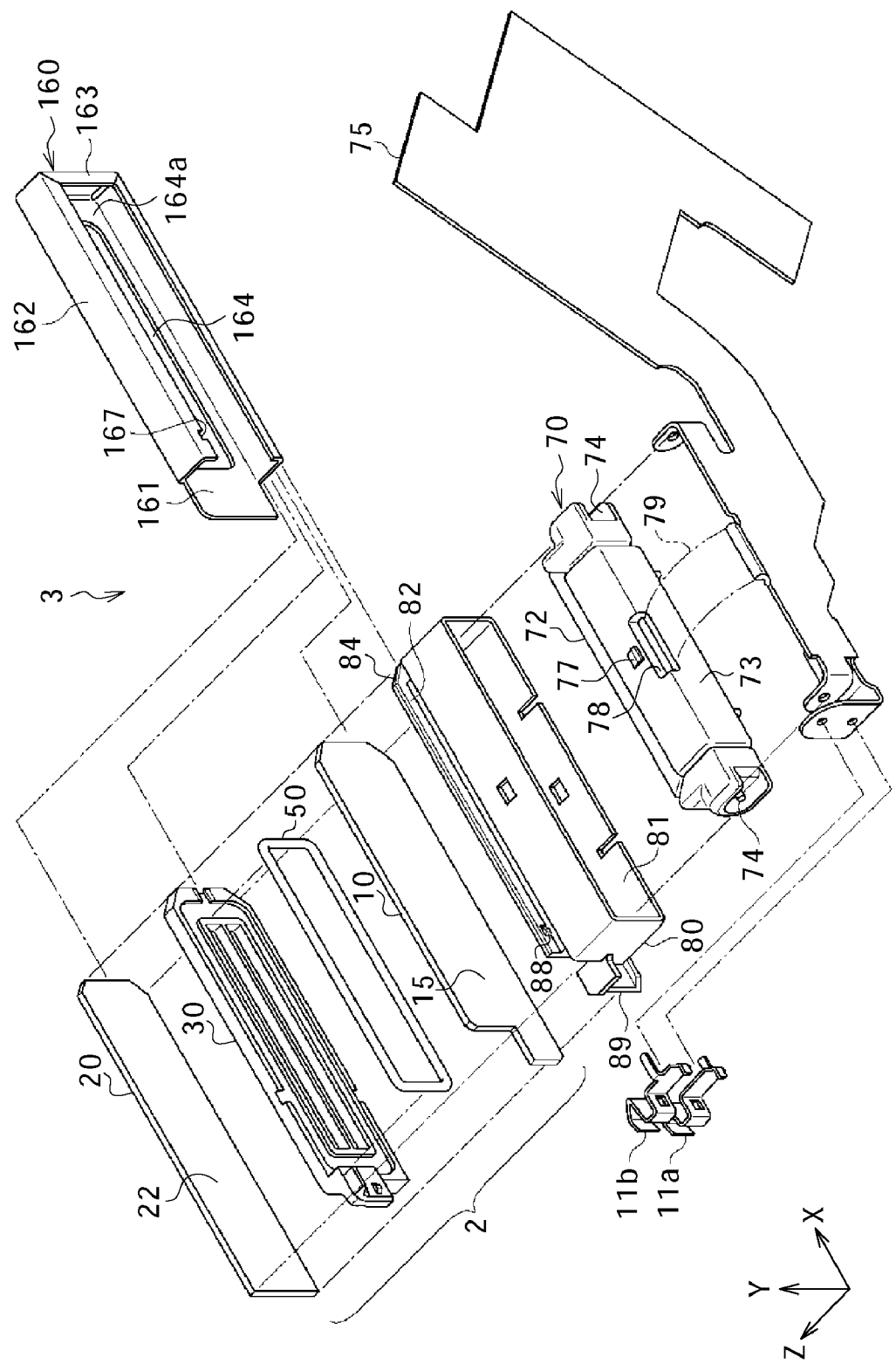
FIG. 18 is an exploded perspective view of the illuminator.

FIG. 16 is a perspective view of an illuminator 3 according to a second embodiment. FIG. 17 is a sectional view of the illuminator 3, taken along line B-B of FIG. 16. FIG. 18 is an exploded perspective view of the illuminator 3.

As shown in these figures, the illuminator 3 has a liquid lens element 2, a light source unit 70, a holder 80 for holding the light source unit 70, and a jig 160. The illuminator 3 is a device obtained by holding and fixing the liquid lens element 2 and the holder 80 by the jig 160, and accommodating the light source unit 70 in the holder 80.

The liquid lens element 2 is the same lens element as the liquid lens element 2 according to the above-described embodiment.

The light source unit 70 has a structure in which a light source 71 and a light condensing member 72 are integrally held and fixed by a casing 73.

While a line light source such as a xenon lamp is used as the light source 71 here, point light sources (light emitting elements) such as LEDs (Light Emitting Diodes) may also be used. Terminals 74, 74 are provided respectively at both end portions of the light source 71, and a flexible substrate 75 is connected to the terminals 74, 74. Incidentally, the flexible substrate 75 is connected also to a terminal 79 for impressing a trigger voltage on the light condensing member 72, and to terminals 11a and 11b which are mounted to the liquid lens element 2.

The light condensing member 72 is composed of a metallic plate or the like, the inside surface of which is mirror finished and by which light emitted from the light source 71 can be reflected into the direction of the optical axis of the liquid lens element 2 (Z-axis direction) to be condensed toward an open end. For instance, the light condensing member 72 has mutually opposed two parabolic surface parts 76, 76 on the inside of which the light source 71 is disposed and which extend in a parabolic shape in one direction on the Y-Z plane, with the light source 71 as a center, to form the open end in the region of the tips thereof. Incidentally, an optical member such as a light guide wherein light is propagated through the inside of a transparent body while repeating total reflection on an interface between the transparent body and an air layer may also be used in place of the light condensing member 72.

The casing 73 holds and fixes the light source 71 and the light condensing member 72 integrally so that the light condensing member 72 can condense the light emitted from the light source 71 and that the light can thus be reflected and condensed. A pair of mutually opposed outside walls of the casing 73 are provided with lock members 77, 77, respectively. Each of the lock members 77, 77 is formed to have such an inclination that its sectional area as viewed in the direction from the open end of the light condensing member 72 toward the light source 71 (Y-axis direction) is gradually increased along the direction. The casing 73, further, is provided with an opening 78 for leading out the terminal 79 for impressing the trigger voltage on the light condensing member 72. With the light source 71 and the light condensing member 72 thus integrally held and fixed by the casing 73, the light source unit 70 is obtained.

The holder 80 (first main body) is held and fixed together with the liquid lens element 2 by the jig 160. The holder 80 has the following configuration, and holds the light source unit 70 therein in a detachable manner.

The holder 80 has a hollow first part 81 which is, for example, substantially rectangular parallelopiped in shape and which is opened on mutually opposed two sides of the substantially parallelopiped shape. Of the mutually opposed open ends of the holder 80, one is used to dispose the open end of the light condensing member 72 therein, and the other is used at the time of mounting the light source unit 70. A mutually opposed pair of longitudinally extending side walls of the first part 81 of the holder 80 are provided respectively with cutouts 86, 86 with which the lock members 77, 77 of the casing 73 can be engaged. With the lock members 77, 77 engaged with the cutouts 86, 86, the light source unit 70 is securely fixed to the first part 81 of the holder 80, without slipping off inadvertently.

A second part 82 is provided at an end portion, where the open end of the light condensing member 72 is disposed, of the first part 81. The second part 82 is a part which constitutes, on one side, a contact surface for making contact with the first substrate 10 of the liquid lens element 2 at the time of fixing the holder 80 to the liquid lens element 2. The second part 82 has the same shape as those of the principal surface parts 14 and 15 of the first substrate 10. Specifically, the second part 82 is provided with tapered parts 84, 84 corresponding to the tapered parts 13, 13 of the first substrate 10. The second part 82 is formed in an annular shape provided with an aperture on the inside, and the aperture constitutes a light passage region 83 through which the light emitted from the light source 71 and condensed by the light condensing member 72 can pass. Of the second part 82, a surface on the side for facing the liquid lens element 2 is provided with an annular groove 87 such as to surround the light passage region 83. An annular elastic member 51 is accommodated in the groove 87.

A terminal mount part 89 corresponding to the terminal mount part 12 of the first substrate 10 is provided at an end portion, opposite to the tapered parts 84, 84 of the second part 82, of the first part 81. Of the second part 82, a surface in a face-back relation with the surface provided with the groove 87 is provided with a lock member 88. The lock member 88 is used for fixing the holder 80 to the jig 160. The lock member 88 is projected from the second part 82 and is formed to have such an inclination that its sectional area as viewed in the direction toward the terminal mount part 89 is gradually increased along the direction.

The jig 160 is a member for holding and fixing the liquid lens element 2 and the holder 80.

The jig 160 is slightly enlarged in width of side plates 162, as compared with the jig 60 in the above-described embodiment, and is provided with a cutout 167 in a predetermined position of a projected part 163. More specifically, the width of the side plates 162 of the jig 160 is larger than the width of the side plates of the jig 60 by an amount corresponding to the thickness of the second part 82 of the holder 80. In addition, the cutout 167 provided in the projected part 163 of the jig 160 can be engaged with the lock member 88 provided at the second part 82 of the holder 80.

The casing 73, the holder 80 and the jig 160 may be formed, for example, from metal, synthetic resin or the like.

The illuminator 3 is a device obtained by holding and fixing the liquid lens element 2 and the holder 80 by the jig 160 and holding the light source unit 70 in the holder 80, as above-mentioned. Here, the liquid lens element 2 and the holder 80 are contained in the following manner.

The liquid lens element 2 and the holder 80 are inserted into the jig 160 through the jig's open end serving as an insertion port, and are slid in the X-axis direction. In this case, the liquid lens element 2 and the holder 80 are inserted into the jig 160 in such a manner that the parts provided with the tapered parts 13, 21, 29, and 84 serve as a leading end in insertion. In this instance, of the second substrate 20 of the liquid lens element 2, a region 23a in the peripheral portion of the second principal surface part 23 makes contact with a main plate 161 of the jig 160. In addition, of the second part 82 of the holder 80, a region which is in a face-back relation with the contact surface making contact with the first substrate 10 makes contact with the projected part 163 of the jig 160.

The liquid lens element 2 and the holder 80 thus inserted in the jig 160 are slid further in the X-axis direction within the jig 160 while being guided by the inside surfaces of side plates 162a and 162b of the jig 160 which are serving as guide surfaces. When the leading ends in insertion of the liquid lens element 2 and the holder 80 come into abutment on a side plate 162c located at an end portion in the X-axis direction of the jig 160, the sliding is finished.

Here, a region 23a (second peripheral part; second engaging part) in the peripheral portion of the second principal surface part 23 of the second substrate 20 of the liquid lens element 2 is engaged with a part 164a (fourth engaging part) located at the outer periphery of the light passage region 164 in the main plate 161 of the jig 160. Incidentally, a projected part 38 of the third substrate 30 is also engaged with the part 164a of the main plate 161.

Besides, a region (first peripheral part; first engaging part) in a face-back relation with the contact surface, making contact with the first substrate 10, of the second part 82 of the holder 80 is engaged with the projected part 163 (third engaging part) of the jig 160.

Here, the annular elastic member 50 provided between the first substrate 10 and the third substrate 30 is compressed between these substrates 10 and 30, and hermetically seals the liquid chambers 40 by its repellent force. Simultaneously, the jig 160 clamps the liquid lens element 2 and the holder 80 in a nipping or sandwiching manner in the Z-axis direction by utilizing the repellent force of the elastic member 50.

In addition, the annular elastic member 51 provided between the holder 80 and the first substrate 10 is compressed between the holder 80 and the first substrate 10. Under the repellent force of the annular elastic member 51, the second substrate 20 of the liquid lens element 2 is pressed against the main plate 161 of the jig 160, and the second part 82 of the holder 80 is pressed against the projected part 163 of the jig 160. As a result, the liquid lens element 2 and the holder 80 are fixed to the jig 160.

This results in that an illuminator 3 is obtained in which the liquid lens element 2 and the holder 80 are securely fixed to the jig 160, without slipping off from the jig 160.

In this illuminator 3, the second substrate 20 of the liquid lens element 2 is exposed through the light passage region 164 of the jig 160, so that light can be incident through the second substrate 20 on a liquid-liquid interface 44 (lens surface) of the liquid 43 contained in the liquid lens device 1. In addition, the light source 71 of the light source unit 70 held by the holder 80 faces the liquid lens element 2 through the light passage region 83. This ensures that the light emitted from the light source 71 and condensed by the light condensing member 72 can enter the liquid lens element 2.

According to the illuminator 3 in this embodiment, the liquid lens element 2 and the holder 80 are held and fixed by only the single jig 160. The jig 160 is engaged with the liquid lens element 2 at its main plate 161, and is engaged with the holder 80 at its projected part 163. Consequently, the total number of component parts is reduced.

In addition, the jig 160 holds the liquid lens element 2 and the holder 80 (which are disposed facing each other) in the manner of surrounding them from four sides, while clamping the liquid lens element 2 and the holder 80 in a pinching or sandwiching manner in the Z-axis direction.

According to the above-described configuration, the jig 160 clamps the liquid lens element 2 and the holder 80 in a pinching or sandwiching manner in the Z-axis direction, so that durability of the optical devices is enhanced, as compared with a configuration wherein the optical device 3 is held by a plurality of jigs. Further, the jig 160 is not directly engaged with the first substrate 10 and the second substrate 20 which are each formed of glass or the like, so that local concentration of stress on a region or regions of the first substrate 10 and the second substrate 20 is restrained. Accordingly, the first substrate 10 and the second substrate 20 are less liable to be damaged, and safety of the illuminator 3 can be enhanced.

According to the illuminator 3 in this embodiment, the liquid lens element 2 and the holder 80 are fixed by being clamped by the jig 160 in the pinching or sandwiching manner, under the repellent force of the elastic member 51.

By the repellent force of the elastic member 51, the liquid lens element 2 and the holder 80 can be assuredly fixed by the jig 160, notwithstanding the jig 160 is a single member.

Method of Manufacturing Illuminator 3

Now, a method of manufacturing the illuminator 3 will be described below.

The liquid lens element 2 is obtained by carrying out the steps S101 to S107 described in the first embodiment above.

The liquid lens element 2 and the holder 80 are combined with each other so that the first substrate 10 and the contact surface of the second part 82 of the holder 80 face each other, and the resulting assembly is inserted into the jig 160 along the X-axis direction from the open side of the jig 160. In this instance, the liquid lens element 2 and the holder 80 are inserted into the jig 160 in such a manner that the parts provided with the tapered parts 13, 21, 29, and 84 serve as a leading end in the insertion direction. Here, the second principal surface part 23 of the second substrate 20 of the liquid lens element 2 makes contact with the main plate 161 of the jig 160, while the second part 82 of the holder 80 makes contact with the projected part 163 of the jig 160.

The liquid lens element 2 and the holder 80 thus inserted in the jig 160 are slid further while being guided by the inside surfaces (guide surfaces) of the side plates 162a and 162b of the jig 160. The cutout 167 provided in the projected part 163 rides over the lock member 88 of the holder 80 to be engaged with the lock member 88, whereon the sliding is finished. In this case, those parts of the liquid lens element 2 and the holder 80 which are provided with the tapered parts 13, 21, 29, and 84 abut on the side plate 162c. These tapered parts 13, 21, 29, and 84 are located at parts where the side plates 162 of the jig 160 are interconnected. Accordingly, the outer peripheral surfaces of the liquid lens element 2 and the holder 80 to be contained in the jig 160 are brought into contact with the inner peripheral surfaces of the jig 160, without any interference between the inside surfaces of the parts where the side plates 162 of the jig 160 are interconnected and the end portions of the liquid lens element 2 and the holder 80.

When the liquid lens element 2 and the holder 80 are contained in the jig 160, the elastic member 50 exhibits a slight repellent force. Under the repellent force, the first substrate 10 is pressed against the holder 80. Similarly, the elastic member 51 exhibits a slight repellent force. Under the repellent force, the holder 80 is pressed against the projected part 163 of the jig 160. Under these repellent forces, the second substrate 20 is also pressed against the main plate 161 of the jig 160. This ensures that the liquid lens element 2 and the holder 80 are pressed against the jig 160, to be assuredly fixed, without slipping off from the jig 160.

Then, the light source unit 70 obtained by integrally holding and fixing the light source 71 and the light condensing member 72 by the casing 73 is contained into the holder 80, whereon the illuminator 3 is obtained.

According to the method of manufacturing the illuminator 3 in this embodiment, when the liquid lens element 2 and the holder 80 are contained in the jig 160, the elastic members 50 and 51 exhibit the repellent forces. Under the repellent forces of the elastic members 50 and 51, the liquid lens element 2 and the holder 80 are pressed against the jig 160.

According to this manufacturing method, under the repellent forces of the elastic members 50 and 51, the liquid lens element 2 and the holder 80 are fixed to the jig 160, and, at the same time, the liquid 43 is assuredly sealed within the liquid chambers 40 in the liquid lens element 2.

As a result, both an operation of holding and fixing of the liquid lens element 2 and the holder 80 and an operation of sealing the liquid 43 are realized by a single process, so that the assembling work is simplified. Furthermore, the fixation is conducted without using screws or the like, the assembling operation is extremely easy to carry out.

Modification

The configuration for fixing the liquid lens element 2 and the holder 80 to the jig 160 is not limited to the above-described configuration.

Figure 19:
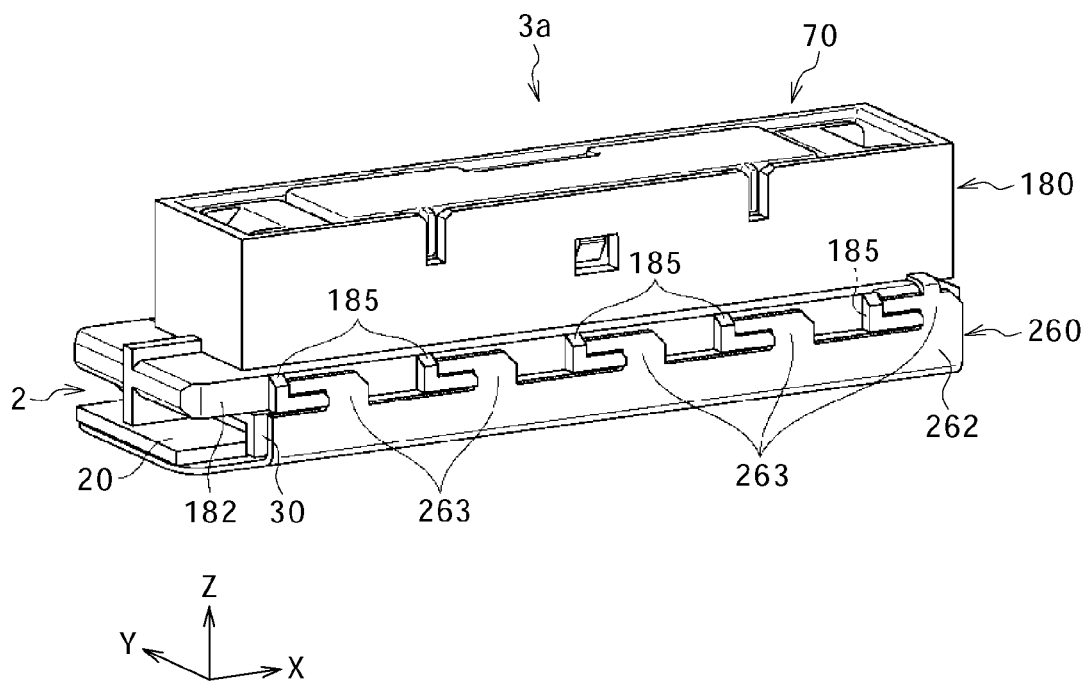
FIG. 19 is a perspective view of a modification of the illuminator.

FIG. 19 is a perspective view of an illuminator 3a as a modification of the illuminator 3.

As shown in the figure, the illuminator 3a is an illuminator obtained by modifying the holder 80 and the jig 160 of the illuminator 3.

Figure 20:
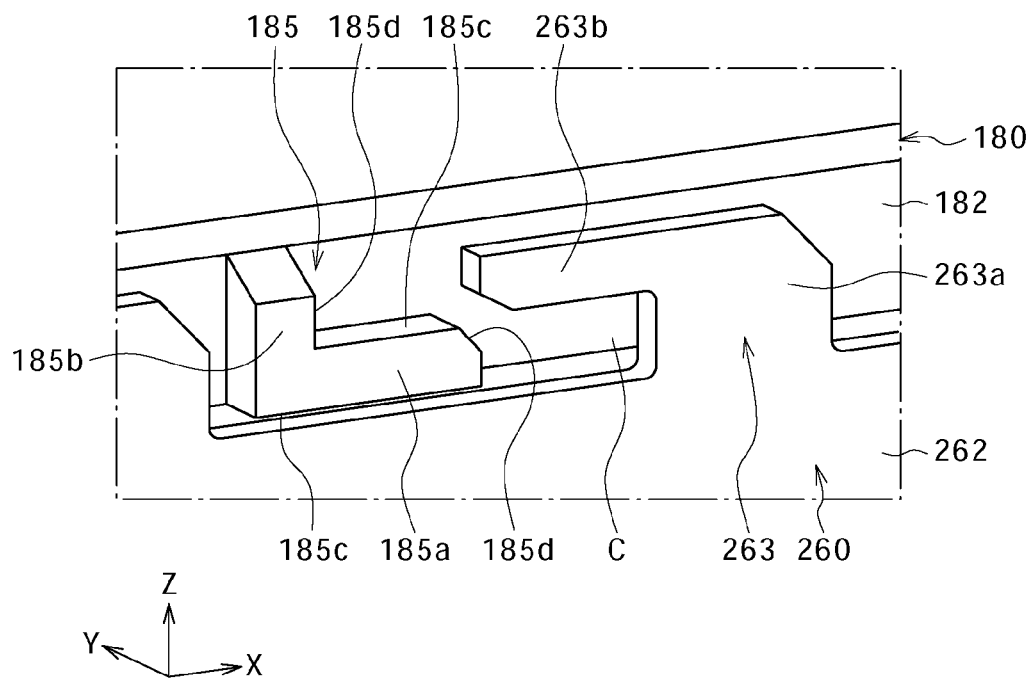
FIG. 20 is a partially enlarged perspective view of the illuminator shown in FIG. 19.

FIG. 20 is a partial enlarged perspective view of the illuminator 3a shown in FIG. 19.

This drawing illustrates the engagement between an engaging part 263 of a jig 260 and an engaging part 185 of a holder 180. For easy understanding, the drawing illustrates the condition where the engaging parts 263 and the 185 are disengaged.

As shown in the figures, the jig 260 of the illuminator 3a is not provided with the projected part 163 and the height of side plates 262 are reduced in the Z-axis direction of the substrates, as compared with the above-described jig 160. Each of the side plates 262 is provided at its end portion with L-shaped engaging parts 263 (third engaging parts) at a predetermined interval along the X-axis direction.

More specifically, the engaging part 263 has a part 263a projected continuously from the end portion of the side plate 262, and a part 263b extending in parallel to the side plate 262 from the projected tip of the part 263a.

A holder 180 of the illuminator 3a is provided, at a side surface (first peripheral part) of a second part 182, with engaging parts 185 (first engaging parts) capable of engagement with the engaging parts 263. The engaging part 185 has an L shape which is substantially in point symmetry with the shape of the engaging part 263. The engaging parts 185 are disposed at a predetermined interval corresponding to the interval of the engaging parts 263.

More specifically, the engaging part 185 has: a part 185a which is inserted into and engaged with a recess region C defined by the end portion of the side plate 262, the part 263a, and the part 263b; and a part 185b which is continuous with the tip of the part 185a and which is brought into contact and engagement with the tip of the part 263b.

Here, the engaging part 185 is engaged with the end portion of the side plate 262 and the part 263b of the jig 260 at those surface regions 185c, 185c (second engaging regions) of the part 185a which are parallel to the insertion direction. As a result, the engaging part 185 is positioned in the Z-axis direction relative to the jig 260.

In addition, the engaging part 185 is meshingly engaged with the parts 263a and 263b of the jig 260 at surface regions 185d, 185d (first engaging regions) where the parts 185a and 185b face the engaging part 263. As a result, the engaging part 185 is positioned in the X-axis direction relative to the jig 260.

In the illuminator 3a, the engaging parts 185 of the holder 180 are thus engaged with the engaging parts 263 of the jig 260 in both the X-axis direction and the Z-axis direction, whereby the liquid lens element 2 and the holder 180 are clamped by the jig 260 in a pinched or sandwiched manner.

Figure 21:
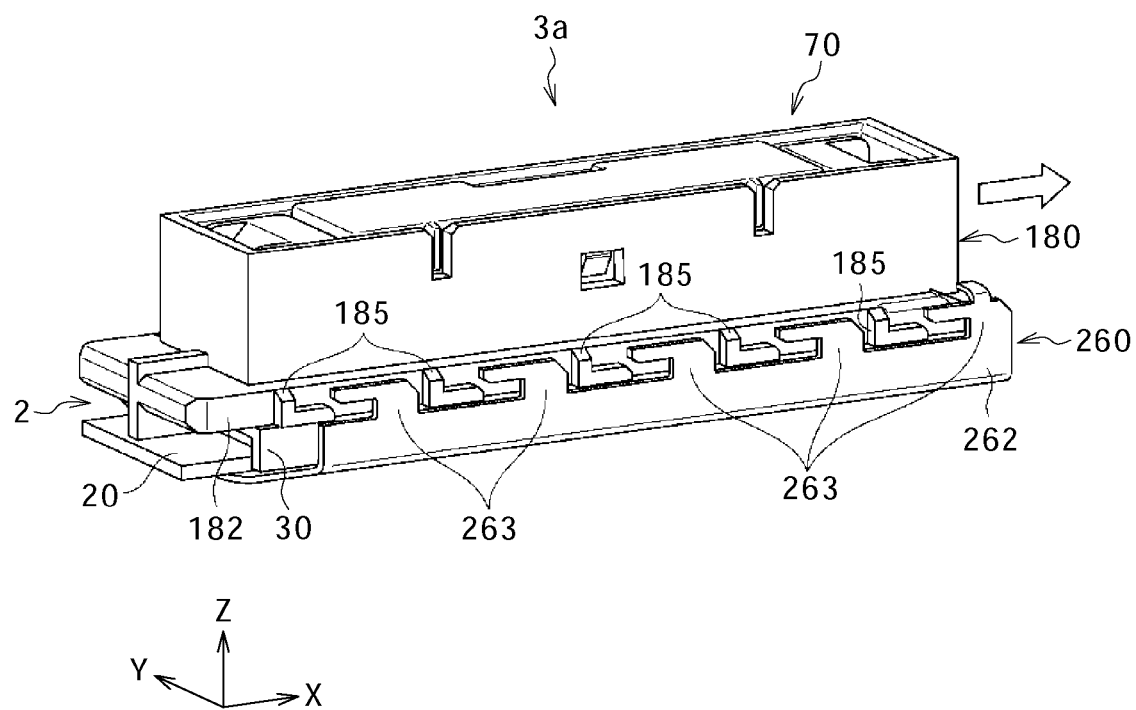
FIG. 21 is a perspective view illustrating a method of manufacturing the illuminator shown in FIG. 19.

This illuminator 3a is manufactured in the manner as shown in FIG. 21.

First, the liquid lens element 2 is disposed in a predetermined position in the jig 260.

Next, the holder 180 is dropped into the jig 260 along the stacking direction of the liquid lens element 2 so that each of the engaging parts 185 is located in that region between the adjacent engaging parts 263 of the jig 260 in which the engaging part 263 is not provided.

Subsequently, the holder 180 is slid in the X-axis direction (in the direction of the void arrow in the figure) to insert the part 185a of each engaging part 185 into the recess region C defined by the end portion of the side plate 262, the part 263a and the part 263b of the jig 260, whereby the engaging parts 185 are engaged with the engaging parts 263 of the jig 260 in both the stacking direction and the longitudinal direction. As a result, the liquid lens element 2 and the holder 180 are clamped by the jig 260 in a pinched or sandwiched manner.

According to the illuminator 3a having the configuration as above, the sliding distance is shortened, as compared with that in the above-described illuminator 3. Consequently, it is ensured that the risk of damaging the first substrate 10 or the like of the liquid lens element 2 is further reduced, the illuminator 3 can be enhanced in safety and durability, and the assembling operation is made easier to carry out.

Electronic Apparatus

Figure 22:
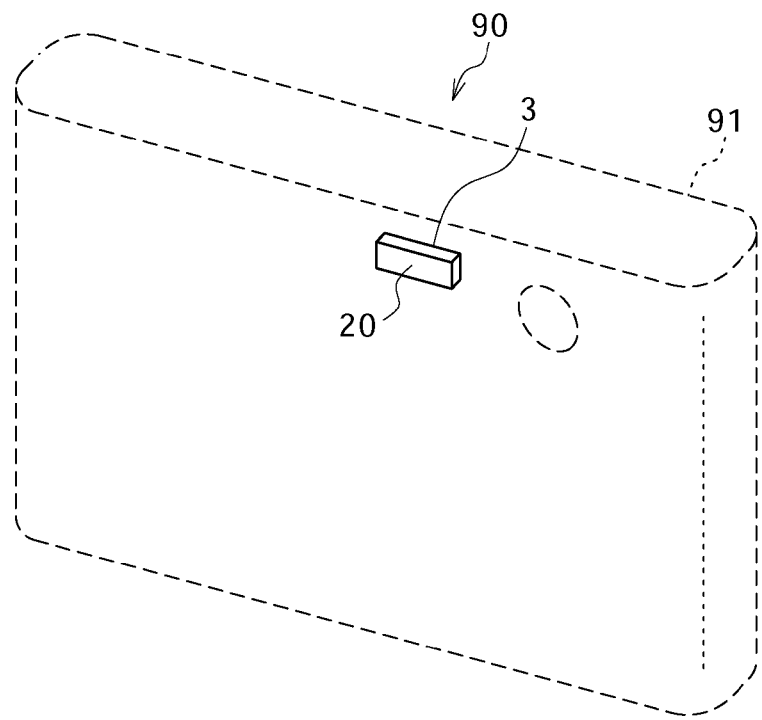
FIG. 22 is a perspective view of an electronic apparatus which includes the illuminator.

FIG. 22 is a perspective view of a digital still camera 90 as an electronic apparatus including the illuminator 3.

The illuminator 3 as a flashlamp device is accommodated in a casing 91 of the digital still camera 90. The illuminator 3 is so provided that the second substrate 20 constituting the part on the light outgoing side is located on the front side of the digital still camera 90.

Embodiments of the present application are not limited to the above-described embodiments, and other various embodiments can be considered.

For instance, while the casing 73 and the holder 80 have been separate members in the second embodiment above, this configuration is not limitative. For example, the casing 73 and the holder 80 may be formed as one body by molding of a resin or the like method.

While the digital still camera has been described as an example of the electronic apparatus, this is not limitative. Other examples of the electronic apparatus include various electrical appliances such as mobile phones.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. An optical device comprising:
a light-transmitting first main body which has
a pair of first peripheral parts parallel to a first direction, and
a first engaging part provided in the first peripheral part, and
which constitutes a part on a light incidence side;
a light-transmitting second main body which has
a second peripheral part parallel to the first direction, and
a second engaging part provided in the second peripheral part, and
which constitutes a part on a light outgoing side;
a third main body which is stacked between the first main body and the second main body in a second direction orthogonal to the first direction, and which defines a liquid chamber between the first main body and the second main body;
a lens surface which is formed by an interface between a plurality of liquids differing in refractive index and sealed in the inside of the liquid chamber, and which is electrically deformable; and
a jig which has a third engaging part for engagement with the first engaging part,
a fourth engaging part for engagement with the second engaging part, and
a connection part for interconnecting the third engaging part and the fourth engaging part, the connection part having guide surfaces for guiding the first engaging part and the second engaging part to positions for engagement with the third engaging part and the fourth engaging part, and
which clamps the mutually stacked first main body, second main body, and third main body in the second direction by the third engaging part and the fourth engaging part.

2. The optical device according to claim 1,
wherein the first main body has
a substrate constituting a wall surface of the liquid chamber, and
a holder capable of accommodating a light source; and
the first peripheral part is provided in the holder.

3. The optical device according to claim 2,
wherein the first engaging part has
a first engaging region for engagement with the third engaging part in the first direction, and
a second engaging region for engagement with the third engaging part in the second direction; and
the first engaging part and the third engaging part are positioned in the first direction and the second direction.

4. The optical device according to claim 2,
wherein the holder has
a contact surface for contact with the substrate; and
the first peripheral part is included in a surface which is in a face-back relation with the contact surface of the holder.

5. The optical device according to claim 1,
wherein the first main body is a substrate constituting a wall surface of the liquid chamber; and
the first peripheral part is included in a surface which is in a face-side relation with a surface, constituting the liquid chamber, of the substrate.

6. A method of manufacturing an optical device, comprising:
stacking a light-transmitting first main body, a light-transmitting second main body, and a third main body so that the third main body is disposed between the first main body and the second main body, thereby forming a liquid chamber between the first main body and the second main body;
sealing in the inside of the liquid chamber a plurality of liquids different in refractive index so as to form an electrically deformable lens surface at an interface between the liquids; and
inserting the mutually stacked first main body, second main body and third main body into a jig along a direction orthogonal to the stacking direction,
whereby the mutually stacked first main body, second main body and third main body are clamped in the stacking direction by the jig.

7. An electronic apparatus comprising:
a casing; and
an optical device accommodated in the casing;
wherein the optical device includes
a light-transmitting first main body which has
a pair of first peripheral parts parallel to a first direction, and
a first engaging part provided in the first peripheral part, and
which constitutes a part on a light incidence side;
a light-transmitting second main body which has
a second peripheral part parallel to the first direction, and
a second engaging part provided in the second peripheral part, and
which constitutes a part on a light outgoing side;
a third main body which is stacked between the first main body and the second main body in a second direction orthogonal to the first direction, and which defines a liquid chamber between the first main body and the second main body;
a lens surface which is formed by an interface between a plurality of liquids differing in refractive index and sealed in the inside of the liquid chamber, and which is electrically deformable; and
a jig which has a third engaging part for engagement with the first engaging part, a fourth engaging part for engagement with the second engaging part, and a connection part for interconnecting the third engaging part and the fourth engaging part, the connection part having guide surfaces for guiding the first engaging part and the second engaging part to positions for engagement with the third engaging part and the fourth engaging part, and which clamps the mutually stacked first main body, second main body, and third main body in the second direction by the third engaging part and the fourth engaging part.

* * * * *